United States Patent
Quigley et al.

(10) Patent No.: US 7,792,618 B2
(45) Date of Patent: Sep. 7, 2010

(54) CONTROL SYSTEM AND METHOD FOR A CONCRETE VEHICLE

(75) Inventors: Thomas P Quigley, Rochester, MN (US); Duane R. Pillar, Oshkosh, WI (US); Bradley C. Squires, New London, WI (US)

(73) Assignee: Oshkosh Corporation, Oshkosh, WI (US)

(*) Notice: Subject to any disclaimer, the term of this patent is extended or adjusted under 35 U.S.C. 154(b) by 1350 days.

(21) Appl. No.: 10/962,172

(22) Filed: Oct. 7, 2004

(65) Prior Publication Data

US 2005/0131600 A1 Jun. 16, 2005

Related U.S. Application Data

(63) Continuation-in-part of application No. 10/325,496, filed on Dec. 20, 2002, now Pat. No. 7,184,866, application No. 10/962,172, filed on Oct. 7, 2004, which is a continuation-in-part of application No. 10/325,439, filed on Dec. 20, 2002, now Pat. No. 6,993,421.

(60) Provisional application No. 60/510,589, filed on Oct. 10, 2003, provisional application No. 60/342,292, filed on Dec. 21, 2001.

(51) Int. Cl.
*G01R 31/00* (2006.01)
(52) U.S. Cl. .......................... 701/33; 714/717
(58) Field of Classification Search .............. 701/29, 701/30, 33, 36; 340/425.5, 426.15, 426.24, 340/465; 702/183; 714/717
See application file for complete search history.

(56) References Cited

U.S. PATENT DOCUMENTS

| | | | |
|---|---|---|---|
| 1,951,089 A | 3/1934 | Fielder | |
| 3,720,863 A | 3/1973 | Ringland et al. | |
| 4,041,470 A | 8/1977 | Slane et al. | |
| 4,162,714 A | 7/1979 | Correll | |
| 4,180,803 A | 12/1979 | Wesemeyer et al. | |
| 4,355,385 A | 10/1982 | Hampshire et al. | |
| 4,453,880 A | 6/1984 | Leisse | |
| 4,516,121 A | 5/1985 | Moriyama et al. | |
| 4,542,802 A | 9/1985 | Garvey et al. | |
| RE32,140 E | 5/1986 | Tokuda et al. | |
| 4,639,609 A | 1/1987 | Floyd et al. | |

(Continued)

FOREIGN PATENT DOCUMENTS

DE 41 11 865 A1 10/1991

(Continued)

OTHER PUBLICATIONS

"Advanced Wireless Technology for CAN and DeviceNet," Apr. 2003 (1 pg.).

(Continued)

*Primary Examiner*—Dalena Tran
(74) *Attorney, Agent, or Firm*—Foley & Lardner LLP

(57) ABSTRACT

A concrete vehicle is described herein which includes a chassis, a concrete handling system, a vehicle subsystem control system, and a wireless communication system configured to communicate with an off-board electronic device. The subsystem control system includes status information for a plurality of vehicle parameters. The wireless communication system is used to communicate status information pertaining to at least one vehicle parameter to the off-board electronic device when the vehicle parameter breaches a threshold.

16 Claims, 9 Drawing Sheets

U.S. PATENT DOCUMENTS

| | | |
|---|---|---|
| 4,646,232 A | 2/1987 | Chang et al. |
| 4,744,218 A | 5/1988 | Edwards et al. |
| 4,760,275 A | 7/1988 | Sato et al. |
| 4,809,177 A | 2/1989 | Windle et al. |
| 4,809,803 A | 3/1989 | Ahern et al. |
| 4,843,557 A | 6/1989 | Ina et al. |
| 4,864,154 A | 9/1989 | Copeland et al. |
| 4,864,568 A | 9/1989 | Sato et al. |
| 4,894,781 A | 1/1990 | Sato et al. |
| 4,941,546 A | 7/1990 | Nist et al. |
| 4,949,808 A | 8/1990 | Garnett |
| 5,025,253 A | 6/1991 | DiLullo et al. |
| 5,046,007 A | 9/1991 | McCrery et al. |
| 5,091,856 A | 2/1992 | Hasegawa et al. |
| 5,124,915 A | 6/1992 | Krenzel |
| 5,189,617 A | 2/1993 | Shiraishi |
| 5,365,436 A | 11/1994 | Schaller et al. |
| 5,416,702 A | 5/1995 | Kitagawa et al. |
| 5,418,437 A | 5/1995 | Couture et al. |
| 5,445,347 A | 8/1995 | Ng |
| 5,463,992 A | 11/1995 | Swenson et al. |
| 5,493,490 A | 2/1996 | Johnson |
| 5,508,689 A | 4/1996 | Rado et al. |
| 5,555,171 A | 9/1996 | Sonehara et al. |
| 5,557,257 A | 9/1996 | Gieffers |
| 5,568,023 A | 10/1996 | Grayer et al. |
| 5,592,375 A | 1/1997 | Salmon et al. |
| 5,619,412 A * | 4/1997 | Hapka ..................... 701/36 |
| 5,623,169 A | 4/1997 | Sugimoto et al. |
| 5,636,122 A | 6/1997 | Shah et al. |
| 5,637,933 A | 6/1997 | Rawlings et al. |
| 5,638,272 A | 6/1997 | Minowa et al. |
| 5,657,224 A | 8/1997 | Lonn et al. |
| 5,670,845 A | 9/1997 | Grant et al. |
| 5,732,074 A | 3/1998 | Spaur et al. |
| 5,736,925 A | 4/1998 | Knauff et al. |
| 5,739,592 A | 4/1998 | Rigsby et al. |
| 5,754,021 A | 5/1998 | Kojima |
| 5,793,648 A | 8/1998 | Nagle et al. |
| 5,794,165 A | 8/1998 | Minowa et al. |
| 5,812,959 A | 9/1998 | Froeburg et al. |
| 5,815,126 A | 9/1998 | Fan et al. |
| 5,819,188 A | 10/1998 | Vos |
| 5,819,201 A | 10/1998 | DeGraaf |
| 5,827,957 A | 10/1998 | Wehinger |
| 5,838,251 A | 11/1998 | Brinkmeyer et al. |
| 5,844,473 A | 12/1998 | Kaman |
| 5,845,221 A | 12/1998 | Hosokawa et al. |
| 5,848,365 A | 12/1998 | Coverdill |
| 5,856,976 A | 1/1999 | Hirano |
| 5,864,781 A | 1/1999 | White |
| 5,884,206 A | 3/1999 | Kim |
| 5,890,080 A | 3/1999 | Coverdill et al. |
| 5,895,454 A | 4/1999 | Harrington |
| 5,896,418 A | 4/1999 | Hamano et al. |
| 5,913,210 A | 6/1999 | Call |
| 5,918,180 A | 6/1999 | Dimino |
| 5,919,237 A | 7/1999 | Balliet |
| 5,922,040 A | 7/1999 | Prabhakaran |
| 5,928,291 A | 7/1999 | Jenkins et al. |
| 5,930,742 A | 7/1999 | Dodd et al. |
| 5,945,919 A | 8/1999 | Trask |
| 5,948,025 A | 9/1999 | Sonoda |
| 5,949,330 A | 9/1999 | Hoffman et al. |
| 5,950,144 A | 9/1999 | Hall et al. |
| 5,957,985 A | 9/1999 | Wong et al. |
| 5,987,365 A | 11/1999 | Okamoto |
| 5,995,898 A | 11/1999 | Tuttle |
| 5,997,338 A | 12/1999 | Pohjola |
| 5,999,104 A | 12/1999 | Symanow et al. |
| 6,012,004 A | 1/2000 | Sugano et al. |
| 6,038,500 A | 3/2000 | Weiss |
| 6,041,310 A | 3/2000 | Green et al. |
| 6,065,565 A | 5/2000 | Puszkiewicz et al. |
| 6,070,538 A | 6/2000 | Flamme et al. |
| 6,088,650 A | 7/2000 | Schipper et al. |
| 6,096,978 A | 8/2000 | Pohjola |
| 6,112,152 A | 8/2000 | Tuttle |
| 6,125,356 A | 9/2000 | Brockman et al. |
| 6,135,806 A | 10/2000 | Pohjola |
| 6,141,608 A | 10/2000 | Rother |
| 6,141,610 A | 10/2000 | Rothert et al. |
| 6,154,122 A | 11/2000 | Menze |
| 6,154,658 A | 11/2000 | Caci |
| 6,157,889 A | 12/2000 | Baker |
| 6,181,994 B1 | 1/2001 | Colson et al. |
| 6,182,807 B1 | 2/2001 | Saito et al. |
| 6,208,948 B1 | 3/2001 | Klingler et al. |
| 6,219,626 B1 | 4/2001 | Steinmetz et al. |
| 6,223,104 B1 | 4/2001 | Kamen et al. |
| 6,230,496 B1 | 5/2001 | Hofmann et al. |
| 6,232,874 B1 | 5/2001 | Murphy |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,263,269 B1 | 7/2001 | Dannenberg |
| 6,281,790 B1 | 8/2001 | Kimmel et al. |
| 6,285,932 B1 | 9/2001 | de Bellefeuille et al. |
| 6,331,365 B1 | 12/2001 | King |
| 6,338,010 B1 | 1/2002 | Sparks et al. |
| 6,356,826 B1 | 3/2002 | Pohjola |
| 6,370,454 B1 | 4/2002 | Moore |
| 6,404,607 B1 | 6/2002 | Burgess et al. |
| 6,405,114 B1 | 6/2002 | Priestley et al. |
| 6,421,593 B1 | 7/2002 | Kempen et al. |
| 6,429,773 B1 * | 8/2002 | Schuyler .................. 340/425.5 |
| 6,430,164 B1 | 8/2002 | Jones et al. |
| 6,430,488 B1 | 8/2002 | Goldman et al. |
| 6,434,512 B1 | 8/2002 | Discenzo |
| 6,466,258 B1 | 10/2002 | Mogenis et al. |
| 6,487,717 B1 | 11/2002 | Brunemann et al. |
| 6,496,775 B2 | 12/2002 | McDonald et al. |
| 6,501,368 B1 | 12/2002 | Wiebe et al. |
| 6,522,955 B1 | 2/2003 | Colborn |
| 6,542,077 B2 | 4/2003 | Joao |
| 6,549,827 B1 | 4/2003 | Yen |
| 6,553,290 B1 | 4/2003 | Pillar |
| 6,580,953 B1 | 6/2003 | Wiebe et al. |
| 6,609,108 B1 | 8/2003 | Pulliam et al. |
| 6,611,740 B2 | 8/2003 | Lowrey et al. |
| 6,611,755 B1 | 8/2003 | Coffee et al. |
| 6,615,186 B1 | 9/2003 | Kolls |
| 6,636,790 B1 | 10/2003 | Lightner et al. |
| 6,694,234 B2 | 2/2004 | Lockwood et al. |
| 6,757,597 B2 | 6/2004 | Yakes et al. |
| 6,798,344 B2 | 9/2004 | Faulkner et al. |
| 6,882,917 B2 | 4/2005 | Pillar et al. |
| 6,885,920 B2 | 4/2005 | Yakes et al. |
| 6,909,944 B2 | 6/2005 | Pillar et al. |
| 6,917,288 B2 | 7/2005 | Kimmel et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,024,296 B2 | 4/2006 | Squires et al. |
| 2001/0034573 A1 | 10/2001 | Morgan et al. |
| 2001/0034656 A1 | 10/2001 | Lucas et al. |
| 2001/0044769 A1 | 11/2001 | Chaves |
| 2002/0010643 A1 | 1/2002 | Chaves |
| 2002/0015354 A1 | 2/2002 | Buckelew |
| 2002/0049523 A1 | 4/2002 | Diaz et al. |
| 2002/0065594 A1 | 5/2002 | Squires et al. |

| | | | |
|---|---|---|---|
| 2002/0065707 A1 | 5/2002 | Lancaster et al. | |
| 2002/0107833 A1 | 8/2002 | Kerkinni | |
| 2002/0111725 A1 | 8/2002 | Burge | |
| 2002/0123832 A1 | 9/2002 | Gotvall et al. | |
| 2002/0133273 A1 | 9/2002 | Lowrey et al. | |
| 2003/0001736 A1 | 1/2003 | Lewis | |
| 2003/0046179 A1 | 3/2003 | Anabtawi et al. | |
| 2003/0080619 A1 | 5/2003 | Bray et al. | |
| 2003/0081123 A1 | 5/2003 | Rupe | |
| 2003/0105565 A1 | 6/2003 | Loda et al. | |
| 2003/0105566 A1 | 6/2003 | Miller | |
| 2003/0114965 A1* | 6/2003 | Fiechter et al. | 701/29 |
| 2003/0130765 A1 | 7/2003 | Pillar et al. | |
| 2003/0144011 A1 | 7/2003 | Richards et al. | |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0163233 A1* | 8/2003 | Song et al. | 701/33 |
| 2003/0171854 A1 | 9/2003 | Pillar et al. | |
| 2003/0182034 A1 | 9/2003 | Katagishi et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2003/0233178 A1 | 12/2003 | Sinex | |
| 2004/0002794 A1 | 1/2004 | Pillar et al. | |
| 2004/0019414 A1 | 1/2004 | Pillar et al. | |
| 2004/0021569 A1 | 2/2004 | Lepkofker et al. | |
| 2004/0023635 A1 | 2/2004 | Impson et al. | |
| 2004/0024502 A1 | 2/2004 | Squires et al. | |
| 2004/0039502 A1 | 2/2004 | Wilson et al. | |
| 2004/0039504 A1 | 2/2004 | Coffee et al. | |
| 2004/0039510 A1 | 2/2004 | Archer et al. | |
| 2004/0055802 A1 | 3/2004 | Pillar et al. | |
| 2004/0069865 A1 | 4/2004 | Rowe et al. | |
| 2004/0070515 A1 | 4/2004 | Burkley et al. | |
| 2004/0133319 A1 | 7/2004 | Pillar et al. | |
| 2004/0133332 A1 | 7/2004 | Yakes et al. | |
| 2004/0154715 A1* | 8/2004 | Dufournier | 152/154.2 |
| 2004/0199302 A1 | 10/2004 | Pillar et al. | |
| 2004/0203974 A1 | 10/2004 | Seibel | |
| 2005/0004733 A1 | 1/2005 | Pillar et al. | |
| 2005/0038934 A1 | 2/2005 | Gotze et al. | |
| 2005/0054351 A1 | 3/2005 | McAlexander | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0119806 A1 | 6/2005 | Nasr et al. | |
| 2005/0128431 A1 | 6/2005 | Jannard et al. | |
| 2005/0131600 A1 | 6/2005 | Quigley et al. | |
| 2005/0209747 A1 | 9/2005 | Yakes et al. | |
| 2005/0234622 A1 | 10/2005 | Pillar et al. | |

FOREIGN PATENT DOCUMENTS

| | | |
|---|---|---|
| DE | 199 29 434 A1 | 12/2000 |
| DE | 101 03 922 A1 | 8/2002 |
| EP | 0 266 704 B1 | 5/1988 |
| EP | 0 504 913 A1 | 9/1992 |
| EP | 0 564 943 B1 | 10/1993 |
| EP | 0 791 506 A2 | 8/1997 |
| EP | 0 949 122 A2 | 10/1999 |
| EP | 1 087 343 A1 | 3/2001 |
| EP | 1 115 264 A2 | 7/2001 |
| EP | 1 229 636 A2 | 8/2002 |
| GB | 2 263 376 A | 7/1993 |
| JP | 2000-333160 A | 11/2000 |
| SE | 507046 C2 | 3/1998 |
| WO | WO-95/15594 A1 | 6/1995 |
| WO | WO-97/02965 A1 | 1/1997 |
| WO | WO-98/30961 A1 | 7/1998 |
| WO | WO-99/23783 A2 | 5/1999 |
| WO | WO-00/69662 A1 | 11/2000 |
| WO | WO-00/79727 A2 | 12/2000 |
| WO | WO-01/15001 A2 | 3/2001 |
| WO | WO-03/059455 A2 | 7/2003 |
| WO | WO-03/059455 A3 | 7/2003 |
| WO | WO-03/060831 A2 | 7/2003 |
| WO | WO-03/060831 A3 | 7/2003 |
| WO | WO-03/061235 A2 | 7/2003 |
| WO | WO-03/061235 A3 | 7/2003 |
| WO | WO-03/093046 A2 | 11/2003 |
| WO | WO 03/093046 A3 | 11/2003 |

OTHER PUBLICATIONS

"AssetVision Brochure," printed on Aug. 8, 2001 (3 pgs.).
"AssetVision Product Specification," Wireless Link, Revision Date: May 18, 1999 (63 pgs.).
"CarPort—The Only Link Between the Auto and the PC," Vetronix Corporation, printed on Jul. 30, 2003 (1 pg.).
"CarPort User's Guide Version 1.0," Vetronix Corporation, Nov. 1999 (40 pgs.).
"Dana Spicer Central Tire Inflation System Specifications," Dana Corporation, Kallamazoo, Michigan, May 2000 (2 pgs.).
"HEMTT—Heavy Expanded Mobility Tactical Truck M977 Series Truck," Product of Oshkosh Truck Corporation, Mar. 2000 (12 pgs. as potocopied).
"LHS Decontamination Mission Module," Product of Oshkosh Truck Corporation, see IDS for date (2 pgs. as photocopied).
"LVS—Logistic Vehicle System (MK48 Series)," Product of Oshkosh Truck Corporation, see IDS for date information (6 pgs.).
"M1070F Heavy Equipment Transporter & Trailer"; Product of Oshkosh Truck Corporation, Sep. 2001 (8 pgs. as photocopied).
"M1977 CBT (Common Bridge Transporter)," Product of Oshkosh Truck Corporation, see IDS for date information (2 pgs. as photocopied).
"Medium Tactical Vehicle Replacement," Product of Oshkosh Truck Corporation, Aug. 2000 (6 pgs. as photocopied).
"MTVR Dump Body Variant (Medium Tactical Vehicle Replacement)," Product of Oshkosh Truck Corporation, Sep. 2001 (2 pgs. as photocopied).
"MTVR Wrecker Variant (MK36 Wrecker Recovery Vehicle)," Product of Oshkosh Truck Corporpation, Sep. 2001 (2 pgs. as photocopied).
"Onboard Computer—Mobius TTS Smarter Mobile Logistics on the Road," Cadec Corporation, Londonderry, NH, estimated date obtained of Aug. 8, 2001 (4 pgs.).
"Oshkosh Demonstrates ProPulse, the First Electric Hybrid—Drive Heavy Defense Truck," Oshkosh Truck Corp., Feb. 27, 2000 (2 pgs.).
"Oshkosh Receives Federal Government Funding to Develop ProPulse Alternative Drive System for Military Turcks," Oshkosh Truck Corp., Aug. 31, 2001 (2 pgs.).
"Oshkosh Showcases ProPulse Hybrid Electric System at Major Defense Exhibition," Oshkosh Truck Corp., Oct. 21, 2002 (1 pg.).
"Oshkosh Truck and Ohio State University Design Robotic Vehicle to Compete in Desert Race," Oshkosh Truck Corp., Feb. 11, 2004 (2 pgs.).
"Oshkosh Truck Awarded Contract for U.S. Army Future Tactical Truck Concepts and Technology Evaluations," Oshkosh Truck Corp., Dec. 2, 2003 (2 pgs.).
"Oshkosh Truck Rolls Out Next Generation of Command Zone Advanced Electronics System to Military Market," Oshkosh Truck Corp., Oct. 21, 2002 (2 pgs.).
"Oshkosh Trucks—75 Years of Specialty Truck Production," Wright et al., Motorbooks International Publishers & Wholesalers, 1992, pp. 119-126 (10 pgs.).
"Oshkosh Truck's Robotic Truck Qualifies for Pentagon's $1 Million Desert Race," Oshkosh Truck Corp., Mar. 12, 2004 (2 pgs.).
"Palletized Load System (PLS)—Concrete Mobile Mixer Module," Product of Oshkosh Truck Corporation, see IDS for date information (2 pgs.).

"Palletized Load System (PLS)—Potable Water Distributor Module," Product of Oshkosh Truck Corporation, see IDS for date information (2 pgs.).
"Televisant Fleet Management—The Concrete Solution," Trimble Navigation Limited, Mar. 2002 (2 pgs.).
"Televisant Ready Mix Industry Plan: maximize your ready mix fleet operation," 2003 (2 pgs.).
"The One to Count on Through Hell and High Water," Product of Oshkosh Truck Corporation, Sep. 2000 (4 pgs.).
"Trimble and McNeilus Enhance Televisant Fleet Management System for the Ready Mix Market," Feb. 4, 2003 (2 pgs.).
"Trimble and McNeilus Form Alliance to Factory-Install Fleet Management Solutions on Ready Mix Concrete Trucks," Mar. 19, 2002 (2 pgs.).
"Vehicle Internet Port (VIP)—Internet Access System for AutoPC," Vetronix Coporation, printed on Jul. 20, 2003 (1 pg.).
"Vehicle Internet Port (VIP) System Description," Vetronix Corporation, printed on Jul. 30, 2003 (2 pgs.).
"Wireless CAN Bridge CB-300," Matric, Apr. 10, 2002 (20 pgs.).
"WirelessRoad Fleet Management System," Vetronix Corporation, printed on Jul. 30, 2003 (2 pgs.).
"WirelessRoad Frequently Asked Questions," Vetronix Corporation, printed on Jul. 30, 2003 (2 pgs.).
"WirelessRoad System Description," Vetronix Corporation, printed on Jul. 30, 2003 (5 pgs.).
Aircraft Internal Time Division Multiplex Data Bus, MIL-STD-1553 (USAF), Aug. 30, 1973 (29 pgs.).
Barraco Klement, M.A., "Agile Support Project—Global Hawk Program," Jan.-Feb. 1999, pp. 66-70 (5 pgs.).
Caterpillar, "Technology Products," printed on Aug. 8, 2001 (2 pgs.).
Computer Diagnoses Vehicle Deficiencies, Sgt. Shawn Woodard, Fort Jackson Leader, Jul. 26, 2002 (2 pgs.).
Construction, "Equipment Trackin-A New Asset Management Method"; Equipment Today, Oct. 1999 (3 pgs.).
Dearborn Group Technology, "Dearborn Group Puts Wireless Vehicle Connectivity in Customers' Hands," Mar. 3, 2001 (3 pgs.).
Dick Smith and Russ Walker, "Coming to a multiplex near you," WasteAge.com, Fire Chief, Feb. 1, 2003 (5 pgs.).
DriverTech—Features, DriverTech, Inc., printed on Jul. 29, 2003 (1 pg.).
DriverTech—Functional Specifications, DriverTech Inc., printed on Jul. 29, 2003 (5 pgs.).
DriverTech—Hardware & Software, DriverTech, Inc., printed on Jul. 29, 2003 (3 pgs.).
DriverTech—Wireless IP-Based Fleet Management System, DriverTech, Inc., printed on Jul. 29, 2003 (2 pgs.).
FAQ, "Global Asset Monitoring," MobileNet; printed on Aug. 8, 2001, copyright marked as 1999 (2 pgs.).
Griffin, Jeff, Rental, "Look, up in the sky . . . it's . . . it's a . . . fleet management satellite!" American Rental Association, MobileNet, printed on Aug. 8, 2001, copyright marked 2000 (4 pgs.).
HGI Wireless Inc. HGI Wireless Products and Services, "Product and Services," HGI Wireless Inc.; printed on Aug. 8, 2001, copyright marked as 2001 (2 pgs.).
Home Page, "An Introduction to InterTrak," InterTrak Tracking Services, LLC., printed on Aug. 8, 2001, copyright marked as 2001 (3 pgs.).
I.D. Systems| Products Gallery, "The I.D. Systems Product Gallery," I.D. Systems, Inc., printed on Aug. 8, 2001 (3 pgs.).
IBM Press room, "IBM ServiceAfterSales Solutions Open Lucrative New Customer Service Markets for Manufacturers and Service Organizations," Press Release, White Plains, NY, Jun. 26, 2001 (2 pgs.).
Interests, "Global Remote Asset Monitoring," MobileNet, printed on Aug. 8, 2001, copyright marked 2000 (2 pgs.).
International Search Report and Written Opinion, PCT/US2004/031216, Oct. 31, 2005 (13 pgs.).
Introduction, printed on Aug. 8, 2001 (7 pgs.).
J.S. Mussaf, "The Space Shuttle Clickable Map," Retrieved from the Internet: http://web.archive.org/web/2001040101, Apr. 1, 2001 (24 pgs.).
Luka, J and Stubhan, F, "Mobile Diagnosis," Vehicle Electronics Conference, 1999 (IVEC 99), proceedings of the IEEE International Changchun, China, Sep. 6-9, 1999 (6 pgs.).

Miltope Recieves $13.5 Million Order for Sport, Montgomery, AL, Jan. 25, 2000 (1 pg.).
Miltope Recieves $16 Million Defense System Integration Award, PRNewswire, Mar. 26, 2000 (1 pg.).
Mobile Workstation, "MobileNet Mobile Workstation," printed on Aug. 8, 2001, copyright marked 2000 (2 pgs.).
MobilEmail, "MobileNet MobilEmail," printed on Aug. 8, 2001, copyright marked 2000 (2 pgs.).
Nathanson M., "Vehicle Intelligence and Remote Wireless OBD," SAE Technical Paper, Dec. 4-6, 2000 (15 pgs.).
Nissan Moter Phils., Inc., "Client: Nissan Motor Philippines, Inc. Project," RADIX Systems Service Corporation, pinted on Aug. 8, 2001, copyright marked 2000 (1 pg.).
Products—CMS Products, "CMS Products," Cadec Corporation, printed on Aug. 8, 2001, copyright marked 2001 (6 pgs.).
Products—Mobius TTS, "Mobius TTS / Onboard Computer," Cadec Corporation, printed on Aug. 8, 2001, copyright marked 2001 (2 pgs.).
Products—Mobius TTS, "Mobius TTS," Cadec Corporation, printed on Aug. 8, 2001, copyright marked 2001 (3 pgs.).
Products—Overview, "Overview—The Right Stuff for 25 Years," Cadec Corporation, printed on Aug. 8, 2001, copyright marked 2001 (2 pgs.).
Products, "MobileNet Products," printed on Aug. 8, 2001, copyright marked 2000 (2 pgs.).
Reizner, S. and Schleicher, M., "Options and risks—PDAs in the automotive area," Aug. 2001 (3 pgs.).
RM CANview Bluetooth/TCP/IP, RM Michaelides Software & Electronic Corp., Nov. 19, 2002 (2 pgs.).
Skibinski, J. et al., "Internet-based Vehicle Communication Network," SAE Technical Paper Series, Dec. 4-6, 2000 (8 pgs.).
Sport Ad and Technical Specifications Sheet, Miltope Corporation, see IDS for date information (2 pgs.).
STE/ICE-R Design Guide for Vehicle Diagnostic Connector Assemblies, Report No. CR-82-588-003 REV 1 Feb. 1988 (182 pgs.).
Technology Products—MineStar, "Minestar," Caterpillar, printed on Aug. 8, 2001 (2 pgs.).
Technology Products—VIMS, "Technology Products," Caterpillar, printed on Aug. 8, 2001 (2 pgs.).
Telematics Diagram, Vetronix Corporation, printed on Jul. 30, 2003 (1 pg.).
Top 100, "Construction Equipment's editors pick the 100 most significant product introductions of the year," Construction Equipment Magazine, Dec. 1999 (1 pg.).
TrakPak2000, "The TrakPak 2000—A Self-Contained Mobile Tracking Unit," printed on Aug. 8, 2001, copyright marked 2000 (2 pgs.).
Trimble Information Services, "Trimble Information Services Power the Transformation of Location Data . . . into Location Information" printed on Aug. 8, 2001 (4 pgs.).
Vermeer Deal, "MobileNet asset monitoring system selected by Vermeer Manufacturing Company," Alpharetta, GA, Nov. 1, 1999 (2 pgs.).
Welcome to Modular Mining Systems, Inc.—Products, "Products—Dispatch Systems for Open Pit Mines," printed on Aug. 8, 2001, copyright marked 1996-2001 (1 pg.).
Welcome to Modular Mining Systems, Inc.—Products, "Products—Vehicle Health Systems (VHS)," printed on Aug. 8, 2001 (1 pg.).
Wireless Link Corporation—News Room, "CSI Wireless Receives $7M Order from InterTrak," Jan. 9, 2001 (3 pgs.).
Annex to Form PCT/ISA/206 Communication Relating to the Results of the Partial International Search, International Application No. PCT/US02/40760, mailed Oct. 13, 2003.
'Customer Applications'; "Benefits of Monitoring and Tracking of Heavy Equipment:"; 2 pg. document; © 2000 MobileNet; [printed from Internet www.mobile-net.com/custapp.htm]; [Page dated Aug. 8, 2001].
'Products'; "MobileNet products"; 2 pg. document; © 2000 MobileNet; [printed from Internet www.mobilenet.com/products.htm]; [Page dated Aug. 8, 2001].

* cited by examiner

CONTROL SYSTEM AND METHOD FOR A CONCRETE VEHICLE

CROSS-REFERENCE TO RELATED PATENT APPLICATIONS

This application claims the benefit of U.S. Provisional Patent No. 60/510,589, filed on Oct. 10, 2003, entitled "Control System and Method for a Concrete Vehicle," which is expressly incorporated by reference herein in its entirety. This application is also a continuation-in-part of: (1) U.S. Ser. No. 10/325,439, filed on Dec. 20, 2002, entitled "Equipment Service Vehicle with Network Assisted Vehicle Service and Repair," pending and (2) U.S. Ser. No. 10/325,496, filed on Dec. 20, 2002, entitled "Equipment Service Vehicle with Remote Monitoring," both of which claim priority to U.S. Prov. No. 60/342,292, filed on Dec. 21, 2001, entitled "Vehicle Control and Monitoring System and Method," all of which are hereby expressly incorporated herein by reference in their entirety.

BACKGROUND

The present description relates generally to the field of concrete placement and transport vehicles (hereinafter "concrete vehicles"), and, in particular, to concrete vehicles that are configured to wirelessly communicate information to an off-board electronic device.

Various vehicles, vehicle types and configurations of vehicles are known for use in placing and transporting concrete. Concrete vehicles typically include a mixing drum rotatably mounted to a chassis. The mixing drum includes mixing blades affixed to the interior of the drum in a spiral pattern to either charge (mix) or discharge concrete. Concrete is moved from an opening in the mixing drum to a desired location using a chute or pumping hose placed at the opening in the mixing drum. A motor mounted to the chassis is used to reversibly rotate the mixing drum for both charging and discharging operations.

In many situations it would be desirable to have an improved concrete vehicles that is capable of wirelessly communicating information related to the chassis and body of the vehicle to an off-board electronic device. Such information may be used to remotely diagnose and monitor the concrete vehicle. For example, in many instances, if there is a problem with the vehicle, the operator is often alerted to the problem only through visual observation. By this time, the concrete vehicle may have sustained significant damage that are expensive to repair. Some of the damage may be prevented and, consequently, the repair costs saved if the operator or other person was alerted to the problem earlier.

It would also be desirable to provide a concrete vehicle that is capable of quickly and efficiently notifying an appropriate person when there is a malfunction aboard the concrete vehicle. In many instances, malfunctions occur that cause significant damage. The damage may have been minimized if the malfunction was discovered earlier. The more that the concrete vehicle is damaged, the more likely it is that the vehicle will need to be taken to a maintenance facility to diagnose and fix the problems. This may result in significant downtime. In other instances, a maintenance technician must be sent to the location of the vehicle to diagnose the problem. This is time consuming and expensive, especially if the vehicle is located a significant distance away when the problem occurs.

It would be desirable to provide a concrete vehicle that provides one or more of these features. Other features and advantages will be made apparent from the present description. The teachings disclosed extend to those embodiments that fall within the scope of the appended claims, regardless of whether they provide one or more of the aforementioned advantages or overcome one of the aforementioned disadvantages.

SUMMARY

According to an exemplary embodiment, a concrete vehicle comprises a first control system. The first control system comprises a second vehicle subsystem control system and a wireless communication system. The second vehicle subsystem control system includes an electronic control unit. The second control system is configured to include status information for a plurality of vehicle parameters. The wireless communication system is configured to communicate with an off-board electronic device. The first control system is configured to communicate status information pertaining to at least one vehicle parameter to the off-board electronic device when the vehicle parameter breaches a threshold.

According to another exemplary embodiment, a concrete vehicle comprises a communication network, a plurality of input devices, and a wireless communication system. The plurality of input devices are distributed throughout the concrete vehicle. The plurality of input devices are configured to communicate status information pertaining to a vehicle parameter across the network. The wireless communication system is used to communicate with an off-board electronic device. The wireless communication system is also configured to receive the status information over the network. The wireless communication system communicates the status information to the off-board electronic device when the vehicle parameter breaches a threshold.

According to another exemplary embodiment, a concrete vehicle comprises an electronic control system which includes a fault code that is used to determine the source of a problem with the vehicle and a wireless communication system which is used to communicate the fault code to an off-board electronic device.

According to another exemplary embodiment, a concrete vehicle comprises a vehicle subsystem control system and a wireless communication system. The vehicle subsystem control system includes an electronic control unit and fault codes. The wireless communication system is configured to communicate the fault codes to an off-board electronic device.

According to another exemplary embodiment, a concrete vehicle comprises a chassis which includes an engine and a transmission, a body which includes a mixing drum, and a control system. The control system comprises a communication network, a plurality of microprocessor based interface modules distributed throughout the concrete vehicle, and at least one vehicle subsystem control system configured to be in communication with at least one interface module. The interface modules are configured to communicate with one another using the communication network. The control system is configured to monitor at least one vehicle parameter and wirelessly communicate status information pertaining to the vehicle parameter to an off-board electronic device when the vehicle parameter breaches a threshold.

According to another exemplary embodiment, a method for performing diagnostic tests on a concrete vehicle comprises establishing a communication link between a first control system located on the concrete vehicle and an off-board computer, performing a diagnostic test on the concrete vehicle, and transmitting the results of the diagnostic test to the off-board computer. The first control system includes a concrete vehicle subsystem. The concrete vehicle subsystem includes a second control system configured to control the subsystem.

DRAWINGS

DETAILED DESCRIPTION

Figure 1:
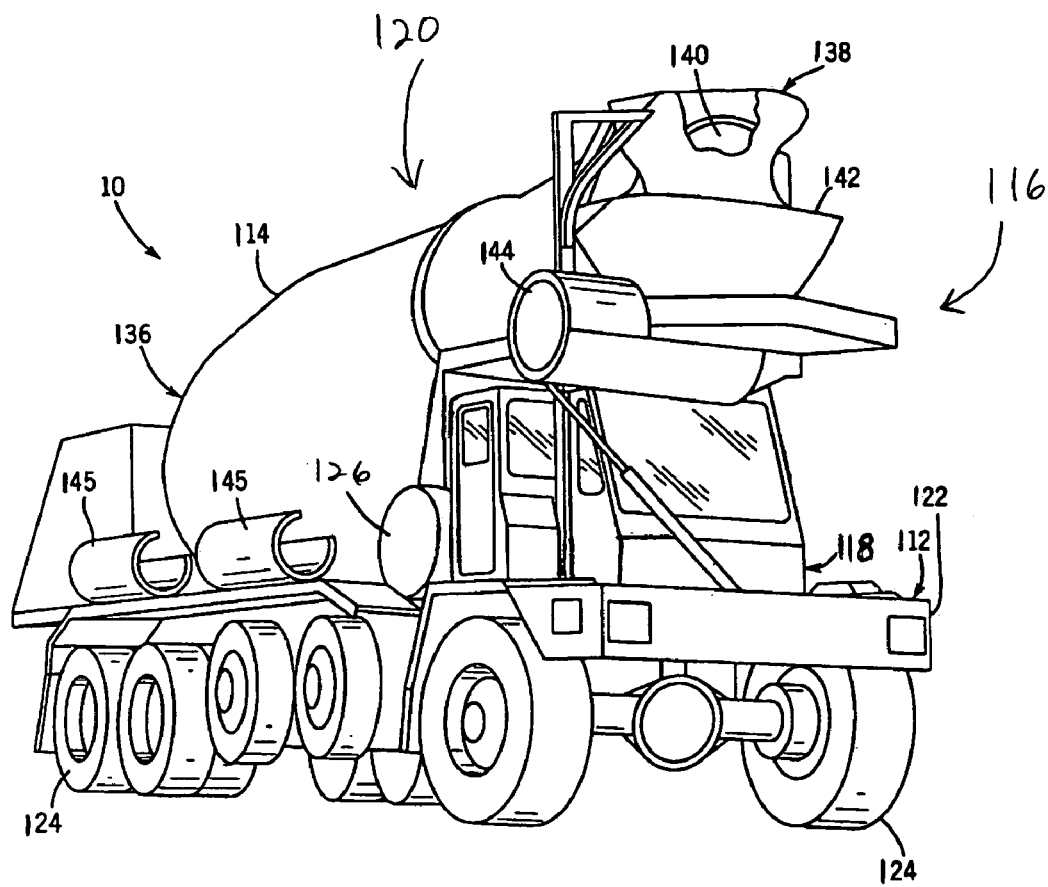
FIG. 1 is a front perspective view of a concrete vehicle according to an exemplary embodiment.

As shown in FIG. 1, a front perspective view of a front discharge concrete vehicle 10 is shown according to an exemplary embodiment. Concrete vehicle 10 is generally configured to mix, transport, and dispense concrete. Concrete vehicle 10 may be divided into chassis 112 and body 116. Chassis 112 includes an engine and a transmission as well as a frame 122 and wheels 124. In general, chassis 112 refers to the combination of components of concrete vehicle 10 that function to move concrete vehicle 10 (e.g., along a road, etc.). Chassis 112 supports a mixing drum 114 and operator compartment 118. Body 116 generally includes mixing drum 114 and an operator compartment 118. In general, body 116 refers to the components of concrete vehicle 10 that are not considered part of chassis 112 (e.g., components used to mix, hold, and dispense concrete, etc).

Although FIG. 1 shows a front discharge concrete vehicle 10, it should be understood that this particular configuration of concrete vehicle 10 is only one embodiment of a suitable concrete vehicle. In other embodiments, concrete vehicle 10 may be a rear discharging concrete vehicle, volumetric mixer concrete vehicle, etc. Accordingly, the particular configuration of concrete vehicle 10 is not critical.

Body 116 includes a concrete handling system 120. Concrete handling system 120 includes mixing drum 114, a water storage and delivery system 126, a spout 142, a chute 144, and chute extensions 145. Depending on the particular embodiment of concrete vehicle 10 that is used, various other components may be included, substituted, or omitted from concrete handling system 120.

In an exemplary embodiment, chute 144 is configured so that it can be adjusted both vertically and horizontally using two electric motors—one motor moves chute 144 horizontally and the other motor moves chute 144 vertically. Of course, in other embodiments, chute 144 may be adjustable by hand (i.e., without the assistance of electrical, hydraulic, or pneumatic devices) or in other suitable ways (e.g., one or more hydraulic motors, etc.).

Mixing drum 114 may be configured in a variety of ways. In an exemplary embodiment, mixing drum has a first or bottom end 136 and a second or top end 138. Bottom end 136 is positioned towards the rear of concrete vehicle 10 and top end 138 is positioned towards the front of concrete vehicle 10. Of course, the position of bottom end 136 and top end 138 depends on the type and configuration of concrete vehicle 10. Top end 138 includes opening 140. In operation, mixing drum 114 is rotated in a conventionally known manner to mix concrete until being emptied through opening 140 into spout 142 and chute 144 (and optionally extension chutes 145).

In an exemplary embodiment, mixing drum 114 includes a plurality of mixing blades (not shown) placed within the interior of mixing drum 114. The mixing blades can be fixably or removably coupled to the interior wall of mixing drum 114 and configured to provide favorable agitation and mixing of the starting materials placed in mixing drum 114. The mixing blades are coupled to the interior wall so that rotation of mixing drum 114 in one direction mixes the starting material and/or concrete (charging), while rotation of mixing drum 114 in an opposite direction causes the concrete in the drum to be emptied through opening 140 (discharging), as described above.

Although mixing drum 114 is shown as being generally oblong shaped with opening 140 at top end 138, mixing drum 114 may also have other suitable configurations. In one embodiment, mixing drum 114 may be substantially rectangular with an open top. In this embodiment, starting material is put into mixing drum 114 through the open top. Once inside mixing drum 114, the starting material may be mixed using a number of suitable mechanisms (auger, rotating blades that rotate independently of the sides of mixing drum 114, etc.). Also, the mixed material (e.g., concrete, etc.) may be dispensed from mixing drum 114 through an opening located at the bottom of mixing drum 114. In another embodiment, the open top may be configured to be covered with a lid (e.g., retractable lid, etc.) so that the concrete is not exposed to the sun, rain, wind, etc.

Typically a mixer motor is used to rotate mixing drum 114 in the desired direction. The mixer motor is often mounted near the bottom end 136 of mixing drum 114 and is coupled to a shaft mounted to mixing drum 114 at the axis of rotation. The mixer motor causes the shaft to rotate, which, in turn, causes mixing drum 114 to rotate. Of course, a number of other configurations may also be provided. For example, the mixer motor may be mounted near the top end 138 of mixing drum 114 or anywhere in between. In an exemplary embodiment, the mixer motor is powered hydraulically from a power takeoff. In other exemplary embodiments, the mixer motor is powered electrically, pneumatically, etc.

In an exemplary embodiment, the mixing motor is configured to rotate mixing drum 114 at a variety of speeds. Typically, the speed at which mixing drum 114 rotates is selected based on a number of criteria. For example, the speed may be chosen based on the desired rate of concrete delivery through opening 140. The speed may also be chosen based on the desired characteristics of the concrete in mixing drum 114 (e.g., mixing together the starting materials, holding the concrete in a steady state, etc.).

Water system 126 may also be configured in a number of ways. In an exemplary embodiment, water system 126 includes a water storage tank, a pump, and a hose and sprayer assembly. The water from water system 126 is dispensed from the water storage tank using the pump and hose and sprayer assembly. In another embodiment, the water storage tank is mounted at a relatively high location on concrete vehicle 10 such as near top end 138 of mixing drum 114. In this embodiment, the water is gravity fed through the hose and sprayer assembly, thus eliminating or reducing the required size of the pump. Of course, a number of other embodiments and configurations of water system 126 may also be provided.

In other embodiments, concrete vehicle 10 may include a number of desired components and/or features depending on the desired use of concrete vehicle 10. For example, in one embodiment, concrete vehicle 10 may include a cooling system that is configured to cool the components of concrete system 120 when, for example, a low slump load is mixed in mixing drum 114. In another embodiment, concrete vehicle 10 may also include a load cell or scale which is used to measure the weight or load of concrete in the mixing drum 114. The load cell or scale may be positioned where the mixing drum 114 rotatably mounts to the truck (e.g., at the pedestal). For example, the scale may be positioned to support the weight of the pedestal so that as concrete is added or unloaded, the weight on the scale changes accordingly. Since, the scale is not the only support structure for the mixing drum 114, the weight change may not correspond 1 to 1 to the amount of concrete added or unloaded. However, a correlation of the weight change at the scale and the amount of concrete loaded and/or unloaded can be used to determine the actual weight of the concrete loaded and/or unloaded.

Figure 2:
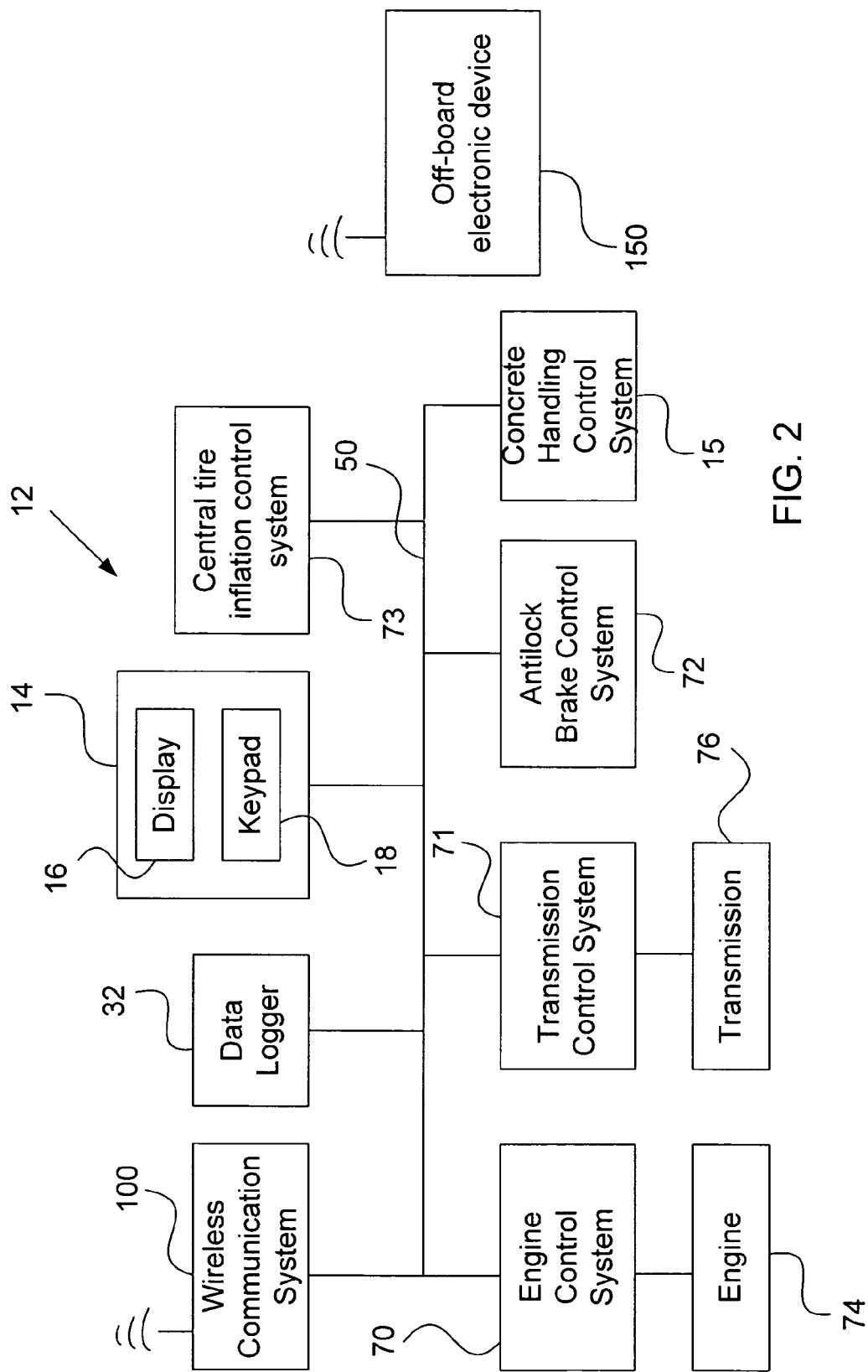
FIGS. 2-4 are block diagrams of exemplary embodiments of a control system for a concrete vehicle.

Referring to FIG. 2, an exemplary embodiment of a first control system 12 for concrete vehicle 10 is shown. Control system 12 is configured to wirelessly communicate with an off-board electronic device 150. In this embodiment, control system 12 includes wireless communication system 100, data logger 32, operator interface 14, a concrete handling control system 15, and a plurality of additional vehicle subsystem control systems 70, 71, 72, and 73 (hereinafter "control systems 70-73"). A communication network 50 is used to communicate information between the various components of control system 12.

In general, data logger 32 is configured to store information regarding the operation of concrete vehicle 10. In an exemplary embodiment, data logger may be configured to store information pertaining to, for example, the amount of concrete in mixing drum 114, the amount of water in water system 126, the slump of the concrete in mixing drum 114, the weight reading from the scales, etc. The information stored in data logger 32 may be accessed at a later time to analyze the performance and operation of concrete vehicle 10 (e.g., generate a vehicle usage report, determine when malfunction first started, etc.). Typically, data logger 32 is a microprocessor based device that stores information in non-volatile memory. However, in other embodiments, data logger 32 may be configured to store information on other suitable mediums.

Data logger 32 may be configured to store information in a number of different ways. For example, in one embodiment, data logger 32 is configured to store certain information about concrete vehicle 10 for the entire operational life of concrete vehicle 10. The type of data stored in this embodiment may include odometer readings when maintenance was performed, fuel usage, history of all the fault codes generated, etc. In another embodiment, data logger 32 may be configured to store certain information by overwriting older information with newer information. For example, in one embodiment, a certain amount of the memory in data logger 32 is allocated to store a particular type or set of information. Once the amount of information stored exceeds the allotted amount of memory then the older information is systematically overwritten as the newer information is stored. This may be desirable to reduce the memory and micro-processor requirements of data logger 32.

In another embodiment, data logger 32 may be configured to store information logged during a predetermined amount of time (e.g., thirty seconds, a minute, an hour, etc.) immediately prior to and/or during the occurrence of one or more trigger events (e.g., sudden deceleration indicating concrete vehicle 10 has been in an accident, discharging concrete, speed of concrete vehicle 10 exceeds a threshold, etc.).

In yet another embodiment, data logger 32 is configured to store information related to a particular diagnostic sequence. Data logger 32 can be configured to store both the steps of the sequence so that it can be performed easily the next time it is run and the status information obtained from performing the particular diagnostic sequence, which can then be recalled at a later time. Of course, these embodiments may be combined to create yet further embodiments as desired.

Communication network 50 is generally configured to provide an effective and reliable network over which information is communicated between the components of control system 12. The network protocol used by communication network 50 may be any of a number of suitable protocols. In an exemplary embodiment, network 50 is configured to use a protocol that is in compliance with the Society of Automotive Engineers (SAE) J1708, J1587, or J1939 protocols. Of course, the particular protocol used is not critical. Accordingly, proprietary and otherwise custom protocols may also be used.

In an exemplary embodiment, communication network 50 is configured to use the same network protocol as control systems 70-73. This facilitates communication of information between control systems 70-73 and communication network 50. However, in other embodiments, the network protocol used by communication network 50 may be different than the protocol(s) used by control systems 70-73. This may occur because control systems 70-73 are provided by the manufacturer of the component that is controlled (e.g., engine control system 70 is provided by the manufacturer of the engine, etc.) rather than being custom designed. Thus, the various manufacturers may not use the same network protocol for the various control systems. In this situation, a converter may be provided at the interface of communication network 50 and control systems 70-73 to convert the information from one protocol to the other protocol.

The medium for communication network 50 may be implemented using copper or fiber optic cable or other suitable media. Copper wire may be desirable because it is inexpensive. In another exemplary embodiment, fiber optic cable is used as the medium. In some situations, a fiber optic cable may be desirable because it minimizes interference from other devices, etc. on concrete vehicle 10 that emit electromagnetic radiation. In another embodiment, the various components of the controls system 12 may communicate with each other over a wireless communication link (e.g., Bluetooth, WiFi, etc.)

Information may be communicated over communication network 50 in a number of ways. In an exemplary embodiment, information is broadcast over communication network 50. The status information may be broadcast at periodic intervals (e.g., half of a second, one second, etc.) or whenever the status of a particular input or output device changes. For example, in one embodiment, information is broadcast from transmission control system 71 over communication network 50 to control systems 70 and 72-73, wireless communication system 100, data logger 32, and operator interface 14, each of which store the broadcast information so that each component of control system 12 knows the status of each input and output device. In another embodiment, the information that is broadcast over communication network 50 is only stored by the individual components if the information is pertinent to that component (e.g., information used as an input for controlling an output, etc.). For example, central tire inflation control system 73 may be configured to broadcast status information across network 50 related to the pressure of the tires. In this embodiment, engine control system 70 receives the broadcast but does not store the information because the tire pressure is not used as an input to control the operation of the engine.

In another embodiment, the various components of control system 12 may be configured so that status information is only received if it is requested by the individual component. For example, operator interface 14 only receives information related to the RPM of the engine if operator interface 14 specifically requests that such information be provided.

In another embodiment, information is communicated over network 50 using a combination of broadcasting and requesting the information. In this embodiment, information that is widely used and/or continually changing (e.g., engine RPM, transmission gear status, etc.) is broadcast over network 50 while information that is not widely used or continually changing (e.g., fuel level, odometer reading, etc.) is only available if specifically requested.

In yet another embodiment, control system 12 may be configured to include a microprocessor-based central controller that is configured to receive information from the other components included as part of control system 12. For example, the central controller may be used to receive and store information from control systems 70-72. The information stored by the central controller may then be communicated to off-board electronic device 150 using wireless communication system 100. The central controller may be coupled to each component included as part of control system 12 separately rather than using a network. In this manner, most or all of the information in the control system is communicated via the central controller. In another embodiment, the central controller may be coupled to communication network 50.

Operator interface 14 is generally configured to allow the operator of concrete vehicle 10 to input commands and view the status of various input and output devices on control system 12. Typically, operator interface 14 includes a microprocessor and memory so the operator can customize operator interface 14. As shown in FIG. 2, in an exemplary embodiment, operator interface 14 includes a display 16 and a keypad 18. However, operator interface 14 may include any of a number of components that are used by the operator to interface with control system 12. In one embodiment, operator interface 14 includes one or more devices that are used to communicate information to the operator (e.g., display 16, LEDs, etc.) and one or more devices that the operator uses to communicate information to control system 12 (e.g., keypad 18, joystick, levers, buttons, switches, etc.). In this manner, the operator is able to easily determine the status of and/or control the input and output devices coupled to control systems 70-73 (e.g., engine 74, transmission 76, etc.) as well as data logger 32, etc. In an exemplary embodiment, the operation of concrete vehicle 10 (e.g., rate of rotation of mixing drum 114, position of chute 144, etc.) is controlled using operator interface 14.

In an exemplary embodiment, display 16 is used to communicate, and, in particular, to display information to the operator of concrete vehicle 10. Display 16 may be any one of a number of various types of displays such as an LCD display, alpha-numeric display, touch screen display, SVGA monitor, etc. Display 16 may also include memory and a microprocessor, which may be the same as the memory and microprocessor for operator interface 14 or may be provided in addition to any memory or a microprocessor that operator interface 14 may include. Display 16 may be configured to provide instructions to the operator for performing various operations such as instructions for diagnosing a problem, interpreting fault codes, etc. For example, display 16 may be used to prompt the operator to enter information using keypad 18 or to take certain actions with respect to vehicle 10 during operation or testing (e.g., bring the engine to a specified RPM level). Display 16 may also be used to display a menu or series of menus to allow the operator to select an operation to perform, obtain information relating to the status of a particular input device or output device that is coupled to network 50 and/or control systems 70-73 (e.g., data logger 32, wireless communication system 100, etc.), etc. Display 16 may also be used to display status information during system startup and during operation, and to display any error messages that may arise. Display 16 may also be used to display fault codes from control systems 70-73, and any other information that is available from control systems 70-73. Display 16 is also capable of displaying graphics of various mechanical systems of concrete vehicle 10 so that the operator can easily ascertain the position or status of the particular vehicle component(s) (e.g., position of chute 144, level of concrete in mixing drum 114, etc).

Operator interface 14 includes keypad 18, which is used to accept or receive operator inputs. For example, keypad 18 is used to allow the operator to scroll through and otherwise navigate menus displayed by display 16 (e.g., menus depicting the status of engine 74 and transmission 76), and to select menu items from those menus. In an exemplary embodiment, keypad 18 is a pushbutton membrane keypad. Other types of keypads and input devices may be used in other embodiments.

In an exemplary embodiment, operator interface 14 is semi-permanently mounted to concrete vehicle 10. By semi-permanently mounted, it is meant that operator interface 14 is mounted within concrete vehicle 10 in a manner that is sufficiently rugged to withstand normal operation of the vehicle for extended periods of time (at least days or weeks) and still remain operational. However, that is not to say that operator interface 14 is mounted such that it can never be removed without significantly degrading the structural integrity of the mounting structure employed to mount operator interface 14 to the remainder of concrete vehicle 10. Operator interface 14 is desirably mounted in operator compartment 118 of concrete vehicle 10, for example, in a recessed compartment within the operator compartment or on an operator panel provided on the dashboard.

Although FIG. 2 shows one operator interface 14, it should be understood that other operator interfaces 14 may also be included as part of concrete vehicle 10. In an exemplary embodiment, concrete vehicle 10 is configured to include one operator interface 14 located in operator compartment 118 and another operator interface 14 located on an external surface of concrete vehicle 10. External operator interface 14 may be located at the rear or side of concrete vehicle 10 so that a person on the outside of the concrete vehicle can easily observe and use it. In this manner, the operator can manipulate the controls of concrete vehicle 10 without continually getting in and out of operator compartment 118.

In an exemplary embodiment, concrete vehicle 10 may be configured with a remote control that is configured to provide the same control capabilities as operator interface 14. The remote control may be configured to be hard wired to concrete vehicle 10 and should provide some mobility to the operator when controlling concrete vehicle 10.

Referring still to FIG. 2, wireless communication system 100 is used to communicate information between control system 12 and off-board electronic device 150. This may be done by direct transmission (e.g., Bluetooth, Wi-Fi, etc.) or through intermediate computers and/or other devices (e.g., Internet, cellular telephone systems, etc.). In an exemplary embodiment, wireless communication system 100 includes a wireless modem with coverage in the geographic region in which concrete vehicle 10 operates. The wireless modem may be used to communicate information between wireless communication system 100 and off-board electronic device 150 by way of the Internet. Other communication links may be used, such as a satellite link, infrared link, RF link, microwave link, either through the Internet or by way of other suitable links. The communication link between control system 12 and off-board electronic device 150 may be secure (e.g., wireless encryption technology, etc.) or insecure as desired. Also, wireless communication system 100 may use digital and/or analog signals to communicate with off-board electronic device 150. In addition, wireless communication system 100 may use some other form of custom or commercially available devices and/or software to connect to off-board electronic device 150.

In an exemplary embodiment, wireless communication system 100 is configured to communicate voice information as well as data information to off-board electronic device 150. Thus, the operator of concrete vehicle 10 is able to speak to a maintenance technician, dispatcher, or other person using wireless communication system 100.

In an exemplary embodiment, off-board electronic device 150 may be configured to communicate directly (i.e., the communications do not pass through other computers external to the equipment service vehicle) with control system 12 from a variety of distances (e.g., ten miles, five miles, two miles, one mile, one-half mile, 1000 feet, 500 feet, 100 feet, and/or 20 feet). The distance at which off-board electronic device 150 communicates with control system 12 may depend on a number of factors such as desired power consumption, communication protocol, etc.

In an exemplary embodiment, off-board electronic device 150 is configured to send information (e.g., control commands, etc.) to control system 12. However, in other embodiments, off-board electronic device 150 may be configured to only receive information (e.g., alerts, status reports, etc.) from control system 12. Also, it may be desirable to configure off-board electronic device 150 to only be able to send information to control system 12 without being able to receive information. Also, access to particular information may be restricted using, for example, a user identification and password.

Off-board electronic device 150 may be any one of a wide variety and configuration of devices such as a pager, a wireless telephone, a landline telephone, a personal digital assistant (PDA), a computer (laptop computer, a desktop computer, a workstation), a watch, etc.

Off-board electronic device 150 is generally used to retrieve, manipulate, and examine information stored and/or controlled using control system 12. For example, off-board electronic device 150 may be used to retrieve and examine the information stored by data logger 32 (e.g., accident reconstruction, etc.). Likewise, if control system 12 includes a vehicle maintenance jacket, off-board electronic device 150 can be used to retrieve and modify information stored in the vehicle maintenance jacket.

In an exemplary embodiment, off-board electronic device 150 is configured to include all the functions of operator interface 14. In some embodiments, off-board electronic device 150 may be configured to include more functions (i.e., display more information, control additional output devices, etc.) than operator interface 14. For example, in one embodiment, off-board electronic device 150 is configured so that the operator can manipulate the throttle of the engine, which may be a function that operator interface 14 is not configured to perform. In another embodiment, off-board electronic device 150 may be configured to include less functions than operator interface 14. This may be desirable where the off-board electronic device is a land-line telephone or pager, for example.

In an exemplary embodiment, off-board electronic device 150 is a computer that is owned by and/or operated under the control of the manufacturer of concrete vehicle 10. This configuration may be desirable because it allows the manufacturer to access and diagnose problems with concrete vehicle 10 from a remote location thus eliminating the need to send a service representative to the location of concrete vehicle 10. In this situation, the manufacturer may be able to access all of the information included in control system 12.

Although control system 12 is described as wirelessly communicating with a single off-board electronic device 150, it should be understood that control system 12 may also communicate with multiple off-board electronic devices 150 rather than just a single device. For example, the computers of multiple dispatchers may be configured to access information available in control system 12 simultaneously or sequentially.

In another exemplary embodiment, off-board electronic device 150 is a computer that is owned by and/or operated under the control of the individual or entity that owns concrete vehicle 10. This configuration may be desirable because the operators of concrete vehicle 10 are able to closely monitor the usage and operation of concrete vehicle 10. For instance, if an order was received for an immediate quantity of concrete to be delivered to a particular location, then the status information of multiple concrete vehicles 10 in the vicinity may be accessed to determine if one of the vehicles 10 may be diverted to fill the request (e.g., does concrete vehicle 10 have enough fuel to deliver the requested concrete, does concrete vehicle have enough concrete to fill the request, etc.).

In an exemplary embodiment, off-board electronic device is a PDA. Generally, a PDA is a computer that is smaller than a conventional laptop or desktop. A PDA includes a microprocessor, memory, an operating system, a power supply (e.g., alkaline batteries, rechargeable batteries, connection to A/C power), a display, an input device, and input/output ports. The major differences between a PDA and a laptop are size, display and mode of data entry. PDAs are generally palm-sized and/or hand-held, while laptops tend to be larger and heavier. Laptops have larger displays and typically use a full size keyboard. PDAs are generally smaller and lighter. They have smaller displays and typically rely on stylus/touch-screen or similar technology and handwriting recognition programs for data entry. PDAs typically do not use keyboards, and, if they do they typically use a miniature keyboard.

In another exemplary embodiment, off-board electronic device 150 is a computer that is configured to access the information from control system 12 via the Internet. In this embodiment, wireless communication system 100 includes a web server that provides the information in the appropriate format. The off-board computer uses web browser software to access the information. The user of the off-board computer is able to click on various portions of control system 12 and/or concrete vehicle 10 to view the associated status information in a format that is easy to understand and view. In another exemplary embodiment, wireless communication system 100 is configured to communicate raw data from control system 12 to the off-board computer. Off-board computer includes a web server that is configured to provide access to the data by way of the Internet.

A concrete handling control system 15 may also be coupled to and/or included with control system 12. Concrete handling control system 15 may include a number of input and/or output devices which may be used to gather information related to concrete handling systems of vehicle 10. For example, the concrete handling control system 15 may be coupled to a scale (e.g., a scale located at the pedestal, etc.) which is used to determine the concrete loading of vehicle 10. Also, the concrete handling control system 15 may be include sensors used to measure the rotational speed and direction of the mixing drum 114, the water level in the water storage and delivery system 126, etc. Moreover, the concrete handling system 15 may be coupled to an output device to control the rotational speed of the mixing drum 114.

As shown in FIG. 2, control systems 70-73 include: engine control system 70, transmission control system 71, anti-lock brake control system 72, and central tire inflation control system 73. Engine 74 and transmission 76 are shown coupled to engine control system 70 and transmission control system 71. However, engine 74 and transmission 76 are generally not considered to be part of control system 12.

By coupling control systems 70-73 to control system 12, an array of additional input and output status information becomes available. For example, coupling engine control system 70 to control system 12 makes data such as the engine RPM, engine hours, oil temperature, oil pressure, oil level, coolant level, fuel level and so on to be available to data logger 32, wireless communication system 100, and operator interface 14. With regard to the transmission, control system 12 has access to, for example, information pertaining to the transmission fluid temperature, the transmission fluid level, and/or the transmission gear status (e.g., 1st gear, 2nd gear, and so on). Assuming that an off-the-shelf engine or transmission is used, the information that is available depends on the manufacturer of the system and the information that they have chosen to make available.

Referring again to FIG. 2, the various blocks depicting wireless communication system 100, data logger, 32, operator interface 14, communication network 50, and control systems 70-73 refer to various functions incorporated into control system 12 that may be implemented as physically separate units, physically integrated units, or a combination of both. For example, data logger 32 and wireless communication system 100 may be physically combined in one housing that performs the same function of both data logger 32 and wireless communication system 100. In another embodiment, wireless communication system 100 may be physically integrated with operator interface 14 so that the resulting combination functions in a manner that is similar to a configuration where the devices are separate yet still coupled together over network 50.

Although control systems 70-73 are shown in FIG. 2, it should be understood that fewer control systems may be used and/or any one of a number of additional vehicle subsystem control systems may also be included in control system 12. For example, any number and combination of the following vehicle subsystem control systems may also be included in control system 12: electronic mixer control system, cruise control system, instrument cluster control system, traction control system, lighting control system, seat adjustment control system, suspension control system, climate control system, four wheel drive control system, air bag control system, anti-theft control system trip computers, entertainment control system, etc. The various embodiments of concrete vehicle 10 may be configured to include any number and combination of the control systems listed above as well as any other additional control systems that are conventionally known to one of ordinary skill in the art For example, in one embodiment, control system 12 may be configured to include only a single additional control system (e.g., engine control system 70, or transmission control system 71, etc.) In another exemplary embodiment, control system 12 may be configured to include at least engine control system 70 and transmission control system 71. In another exemplary embodiment, control system 12 may be configured to include at least a mixer control system. Accordingly, control systems 70-73 are simply provided as examples of the numerous control systems that may be used in conjunction with concrete vehicle 10.

Access to various status information provided by control systems 70-73 may be controlled in a variety of ways. For example, in an exemplary embodiment, information from any one of control systems 70-73 is available to the remainder of control systems 70-73. Thus, each control system 70-73 has complete access to the information from the other control systems. In another embodiment, a particular control system 70-73 does not have access to the information included in the other control systems 70-73. This may be desirable to prevent unnecessary and burdensome communications over network 50 and/or to reduce the size and complexity of the software used in control system 12.

Figure 3:
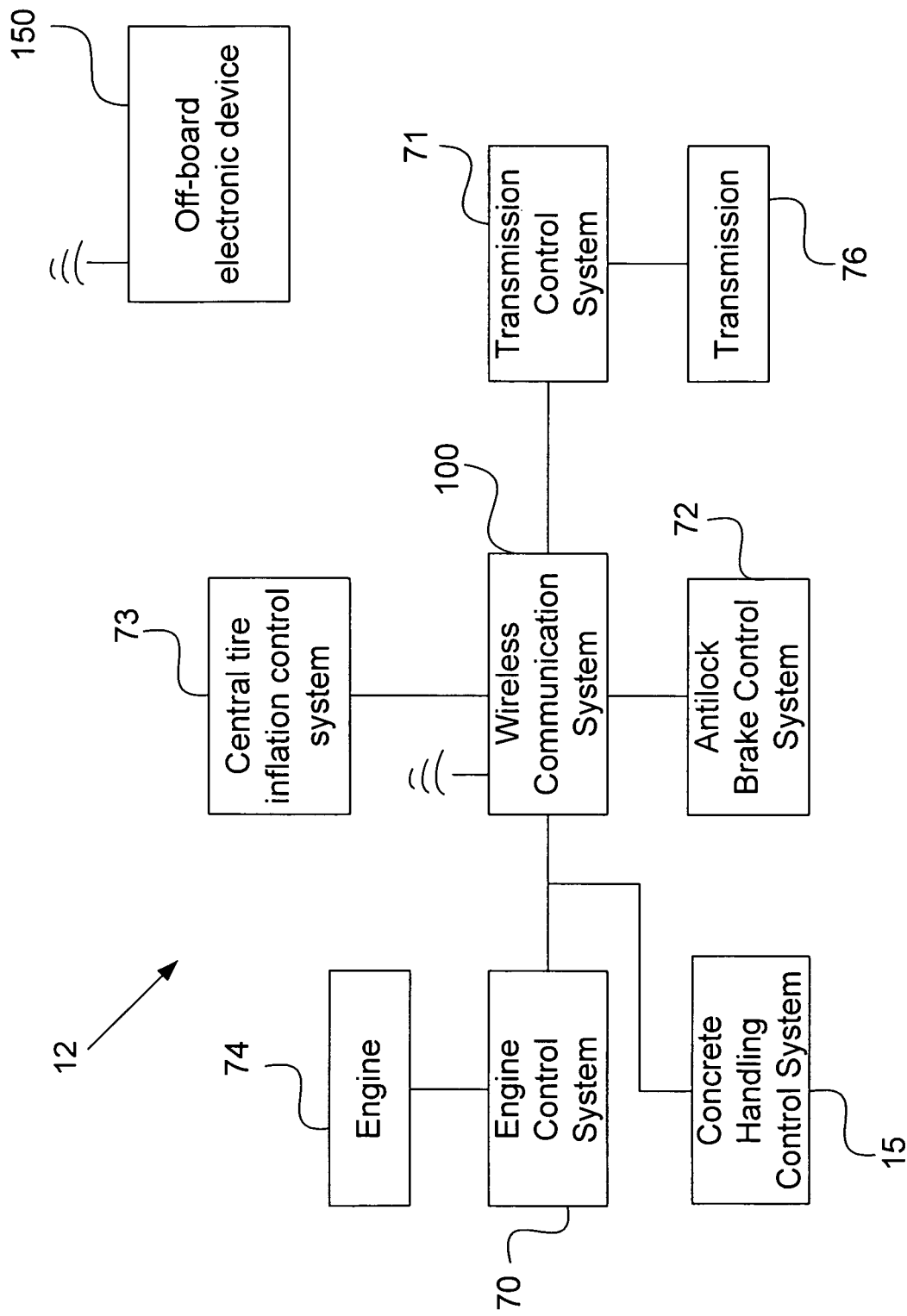

Referring to FIG. 3, another exemplary embodiment of control system 12 is shown. In this embodiment, control system 12 includes wireless communication system 100 and control systems 70-73. Engine control system 70 is used to control engine 74, and transmission control system 71 is used to control transmission 76. Wireless communication system 100 is used to communicate information between control system 12 and off-board electronic device 150. In general, the operation and configuration of the various components of control system 12 as shown in FIG. 3 are similar to the operation and configuration of control system 12 shown in FIG. 2.

Control system 12, shown in FIG. 3, differs from that shown in FIG. 2 in that data logger 32 and operator interface 14 are no longer present. This is not to say that concrete vehicle 10 does not include data logger 32 or operator interface 14. Rather, it simply means that these components are not coupled to control system 12.

In the exemplary embodiment shown in FIG. 3, wireless communication system 100 is coupled individually to control systems 70-73. In an exemplary embodiment, control systems 70-73 are configured so that they cannot communicate with each other. Rather, information is only communicated between the individual control system 70-73 and wireless communication system 100. In another exemplary embodiment, control systems 70-73 are configured so that information may be communicated between control systems 70-73 by way of wireless communication system 100.

Although FIG. 3 shows control systems 70-73 coupled to wireless communication system 100, it should be understood that control system 12 may include any number and configuration of additional control systems that are coupled to wireless communication system 100. For example, in an exemplary embodiment, control system 12 comprises wireless communication system 100 coupled to engine control system 70 without any additional control systems included. In another exemplary embodiment, control system 12 comprises multiple ones of the control systems listed above that are configured to communicate information between each other.

Control systems 70-73 as well as the other control systems mentioned previously may be configured to monitor the input and output devices necessary to provide conventional on board diagnostic codes such as diagnostic codes that are in compliance with the SAE OBD and OBD-II standards. Of course, other additional information may also be included.

Figure 4:
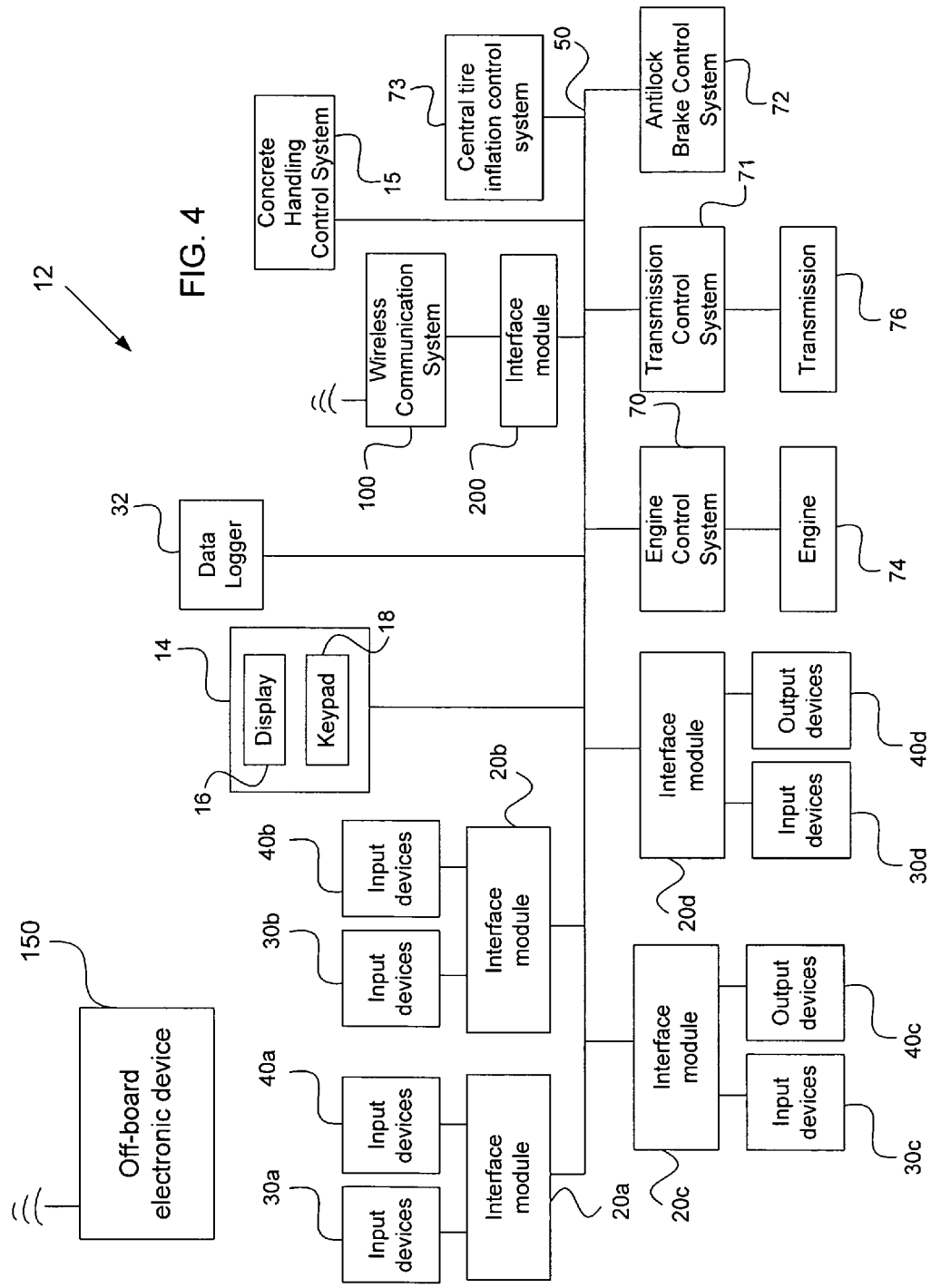

Referring to FIG. 4, another exemplary embodiment of control system 12 is shown. By way of overview, control system 12 includes operator interface 14, a plurality of microprocessor-based interface modules 20a-20e (collectively referred to as interface modules 20), a plurality of input devices 30*a*-30*d* (collectively referred to as input devices 30), a plurality of output devices 40*a*-40*d* (collectively referred to as output device 40), data logger 32, and control systems 70-73. Operator interface 14 and interface modules 20 are coupled to each other by communication network 50. In general, control system 12 shown in FIG. 4 is similar to that shown in FIG. 2 with the exception of interface modules 20, input devices 30, and output devices 40 included in control system 12 shown in FIG. 4. Of course, there may also be other differences between the two embodiments of control system 12.

Control system 12 may be configured in a number of different ways. For example, control system 12 may be configured to include multiple control systems that are coupled together. One example of such a configuration is where control system 12 is coupled to one or more of control systems 70-73. Another example is a configuration where concrete vehicle 10 has one control system to control chassis 112 and another control system to control body 116. Also, control system 12 may be configured to include multiple nested control systems so that control system 12 may include a smaller control system that forms a part of the overall control system 12. Thus, it should be understood that the particular configuration of control system 12 shown in FIG. 4 is only one of many possible embodiments.

As mentioned above, concrete vehicle 10 may be any of a number of concrete vehicles. Accordingly, control system 12 may be used in conjunction with any suitable concrete vehicle 10 regardless of whether it discharges concrete from the front or rear, or is configured in any other fashion. The advantages of control system 12 apply equally to a vast array of other concrete vehicles. Thus, embodiments and examples of control system 12 described in the context of a front discharge concrete vehicle are equally applicable to other concrete vehicles.

Referring to FIG. 4, in an exemplary embodiment, interface modules 20 are microprocessor-based and include a plurality of analog and/or digital inputs and outputs which are coupled to and communicate with input and output devices 30 and 40, respectively. In general, in order to minimize wiring, the interface modules 20 are placed close to input devices 30, from which status information is received, and output devices 40 that are controlled. In one embodiment, interface modules 20 are coupled to input and output devices 30 and 40 via a dedicated communication link, which may simply be a hard-wired link between an interface module 20 and an input or output device 30 or 40. In an alternative embodiment, input or output devices 30 or 40 may be coupled directly to communication network 50 and configured to communicate directly over communication network 50 to all of the interface modules (e.g., the status of the device is broadcast over the network), one interface module (e.g., the interface module requested information from the particular input or output device 30 or 40), or a subset of interface modules on the network. It should be understood that, in general, input and output devices 30 and 40 are different than the input and output devices included as part of control systems 70-73. However, that is not to say that they must always be different. Certain embodiments may include input and output devices 30 and 40 that may be the same or similar to the input and output devices in control systems 70-73.

In an exemplary embodiment, interface modules 20 are identical both in software, hardware, and physical dimensions. Thus, interface modules 20 are physically and functionally interchangeable because they are capable of being plugged in at any position on communication network 50, and are capable of performing any functions that are required at that position. In an alternative embodiment, interface modules 20 may be different in software, hardware, and/or physical dimensions. Using interface modules 20 with different configurations allows the interface modules 20 to be constructed in a manner which is more narrowly tailored to the functions performed.

In an exemplary embodiment, each of the interface modules 20 stores I/O status information for all of the other interface modules 20. In this configuration, each interface module has total system awareness. As a result, each interface module 20 processes its own inputs and outputs based on the I/O status information. The I/O status information may be provided to interface modules 20 in a number of ways. For example, in an exemplary embodiment, each of interface modules 20 may be configured to broadcast the status of input devices 30 over communication network 50 to the other interface modules 20 at predetermined intervals. In another exemplary embodiment, interface modules 20 may be configured to simultaneously or sequentially broadcast the status information to the other interface modules 20. In another exemplary embodiment, interface modules 20 may be configured to broadcast the status information in response to a change in the state of one of input devices 30 or output devices 40. This lessens the amount of traffic over communication network 50. In another exemplary embodiment, one interface module 20 may be designated the master controller which is configured to control the input and output devices coupled to the remaining interface modules 20. Of course, any of these embodiments may be combined. For example, each of interface modules 20 may be configured to broadcast I/O status information at predetermined intervals and in response to a change in the state of one of input devices 30.

In another exemplary embodiment, as mentioned previously, some of the input and/or output devices 30 or 40 may be coupled directly to communication network 50. In this configuration, the input devices 30 may broadcast status information across network 50 to interface modules 20 and control signals may be transmitted to output devices 40. Thus, one or more of interface modules 20 may be configured to control output devices 40 coupled directly to communication network 50. Input and/or output devices 30 or 40 coupled directly to communication network 50 typically do not store the status information broadcast across the network for other I/O devices. However, in an alternative embodiment, input and/or output devices 30 or 40 may be configured to store the status information broadcast by the other interface modules 20 and/or other devices on communication network 50.

Power is provided to interface modules 20 from a power source by way of a power transmission link. The power transmission link may comprise, for example, a power line that is routed throughout concrete vehicle 10 to each of interface modules 20. Interface modules 20 then distribute the power to output devices 40 (e.g., to form the dedicated communication links as previously mentioned). This type of distributed power transmission dramatically reduces the amount of wiring needed for concrete vehicle 10. In an exemplary embodiment, each interface is configured to include multiple power outputs that are capable of handling currents not less than approximately 2 amps, 5 amps, 10 amps, or, desirably, 15 amps.

Input devices 30 and output devices 40 are generally located throughout vehicle 10. Input and output devices 30 and 40 may be further divided according to whether input and output devices 30 and 40 pertain to the chassis or the body of vehicle 10. Input and output devices 30 and 40 pertaining to the body may be referred to as body input and output devices (e.g., input device that measures the rotational speed of mixing drum 114, output device that controls the flow of water in water system 126, etc.) and input and output devices 30 and 40 pertaining to the chassis may be referred to as chassis input and output devices (e.g., input device that measures the speed of vehicle 10, output device that controls the state of the transmission, etc.). Input and output devices 30 and 40 may be any of a number of devices that are used to receive inputs and control outputs. In an exemplary embodiment, input devices 30 include devices that provide inputs used to control output devices 40. Also, input devices 30 may include devices that provide status information pertaining to vehicle parameters that are not used to control output devices 40 but may be used for other purposes (e.g., diagnosing faults in vehicle 10, generating reports regarding utilization of vehicle 10, inform operator of status of a device, etc.). The type and configuration of input and output devices 30 and 40 is not critical and will depend on the type of vehicle.

Communication network 50, operator interface 14, data logger 32, wireless communication system 100, and control systems 70-73 shown in FIG. 4 are generally capable of being configured as described previously. The addition of interface modules 20, input devices 30, and output devices 40 also makes a substantial amount of additional information available to operator interface 14, data logger 32, and wireless communication system 100.

In an exemplary embodiment, wireless communication system 100 is coupled to control system 12 by way of interface module 20e. In one embodiment, interface module 20e is coupled to wireless communication system 100 as well as to other input devices 30 and/or output devices 40. In another embodiment, wireless communication system 100 is configured to be coupled directly to communication system 100. In still another embodiment, wireless communication system 100 is configured to be coupled to an interface module that is dedicated solely to communication between wireless communication system 100 and control system 12.

In general, off-board electronic device 150 is configured to communicate with control system 12 by way of wireless communication system 100. In an exemplary embodiment, off-board electronic device 150 is configured to have access to all of the information available in control system 12. This includes I/O status information (e.g., I/O status information from input and output devices 30 and 40 as well as I/O status information from control systems 70-73, etc.). Off-board electronic device 150 may also have access to information contained in data logger 32. Thus, the person using off-board electronic device 150 has access to all of the information available in control system 12. In an alternative embodiment, off-board electronic device 150 may be configured so that less than all of the information contained in control system 12 is available. For instance, if off-board electronic device 150 is a computer owned and/or operated by someone beyond the control of the owner of concrete vehicle 10 (e.g., manufacturer's computer, contracted repair facility's computer, etc.) then certain information that is not related to diagnosing and repairing concrete vehicle 10 may be inaccessible (e.g., utilization data stored in data logger 32, etc.) to prevent unauthorized access. Additionally, it may be desirable to limit the amount of information available to off-board electronic device 150 to accommodate the capacity of the wireless link (e.g., cellular phone link, etc.)

Figure 5:
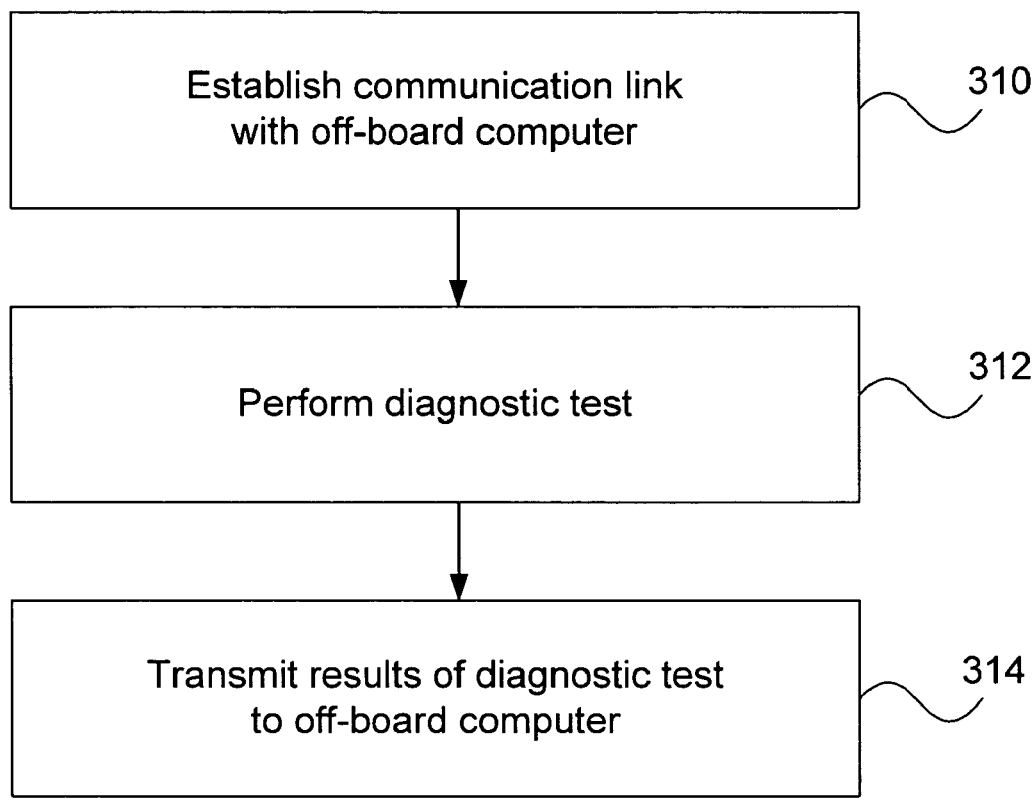
FIGS. 5 and 6 are block diagrams of exemplary embodiments of processes for performing a diagnostic test on a concrete vehicle.
Figure 6:
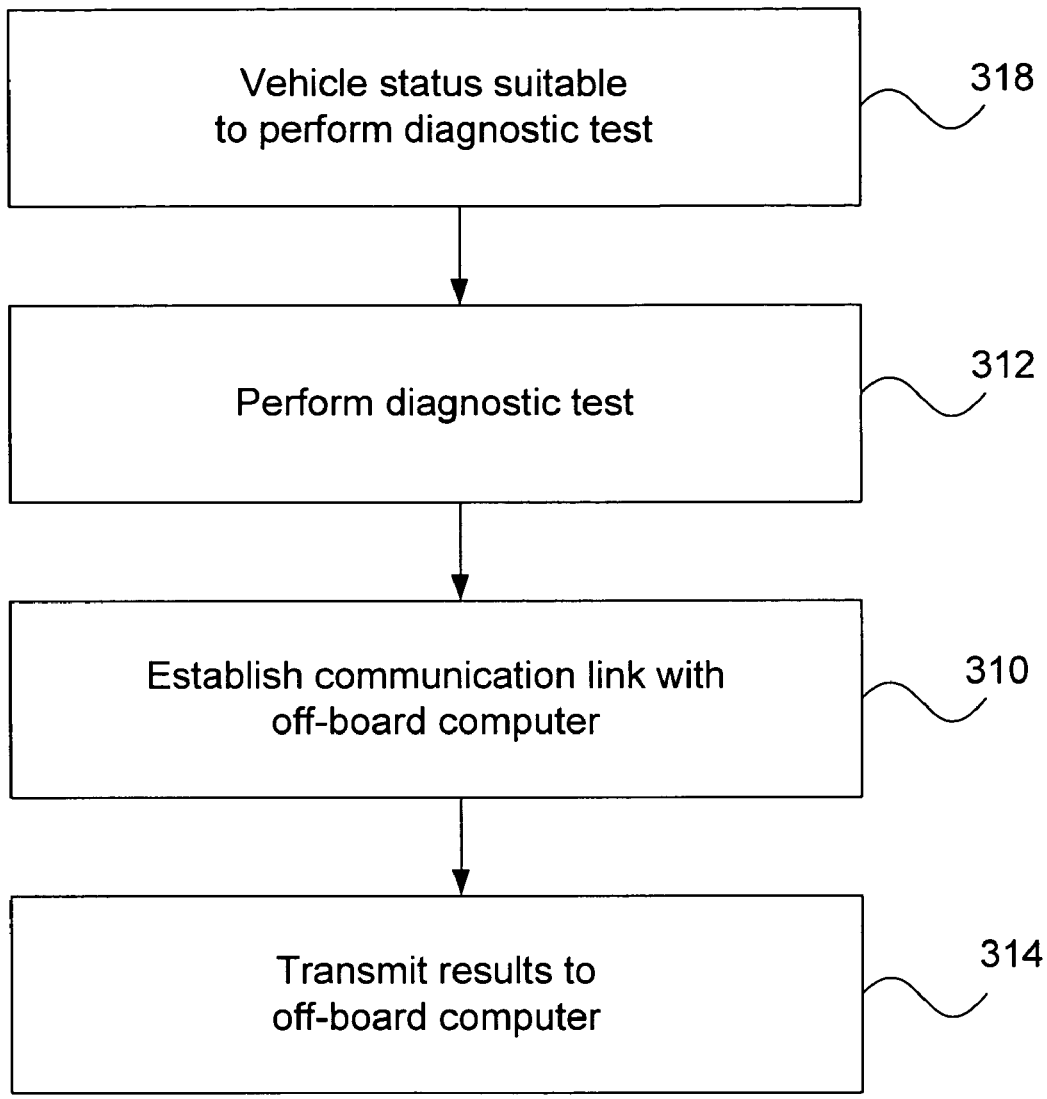
Figure 7:
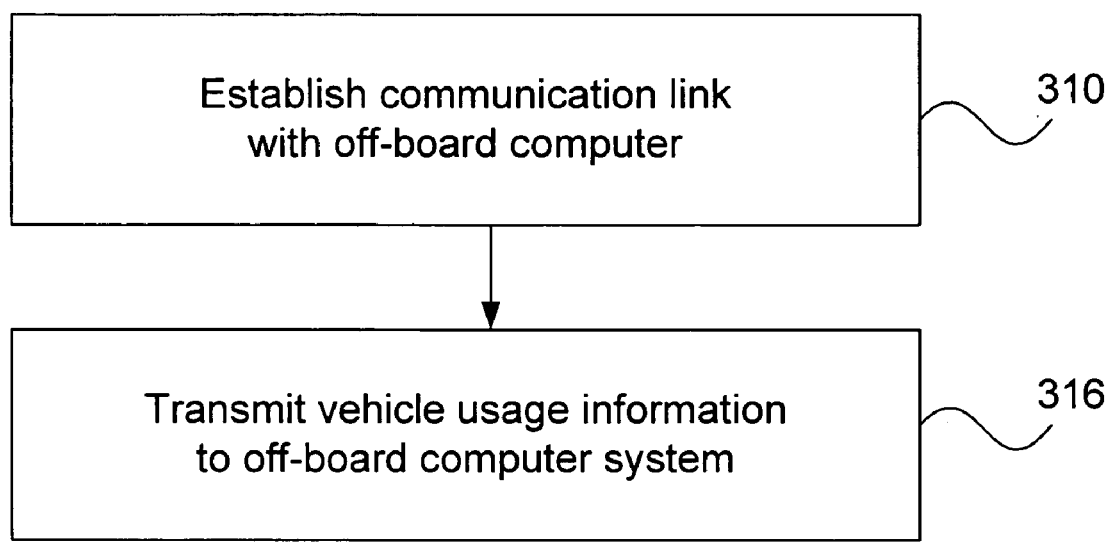
FIG. 7 is a block diagram of an exemplary embodiment of a process for communication information from a concrete vehicle to an off-board electronic device.

FIGS. 5-7 show diagrams of exemplary embodiments of using control system 12 to remotely diagnose and monitor concrete vehicle 10 and to transmit notifications of a threshold breach and/or fault codes. Each of these Figures is described in further detail below.

Referring to FIG. 5, control system 12 may be configured to perform a diagnostic test or series of diagnostic tests according to an exemplary embodiment. There are a wide array of diagnostic tests that may be performed. For example, diagnostic tests may be performed on the elements of the mixer control system (e.g., charge coil, discharge coil, mixing drum 114 speed sensor, mixing drum 114 direction sensor, etc.) Also, diagnostic tests may be performed on the components of any of the vehicle subsystem control systems that are part of control system 12. In one embodiment, the diagnostic tests may be used to simply identify a fault and communicate the fault code to the off-board electronic device 150. In other embodiments, the off-board electronic device may be used in a more active role to further diagnose and manipulate components of control system 12. Table 1 provides a non-exhaustive list of some of the various diagnostic tests that may be used.

| Test | Test Description and Application | Exemplary Measurement Range(s) |
| --- | --- | --- |
| LIGHT TESTS | | |
| Turn Signals | Determine if turn signals are working | PASS/FAIL |
| Headlights | Determine if headlights are working | PASS/FAIL |
| Clearance Lights | Determine if clearance lights are working | PASS/FAIL |
| Interior Lights | Determine if interior lights are working | PASS/FAIL |
| Brake Lights | Determine if brake lights are working | PASS/FAIL |
| CHASSIS TESTS | | |
| Horn Test | Determine if horn is working | PASS/FAIL |
| Tire Pressure (psi) | Determine if tire pressure is acceptable | 26-120 psi |

-continued

| Test | Test Description and Application | Exemplary Measurement Range(s) |
|---|---|---|
| ENGINE TESTS | | |
| Engine RPM (AVE) | Measures average speed of engine crankshaft. | 50-5000 RPM |
| Engine RPM, Cranking SI only | Measures cranking RPM. Performed with ignition ON. Inhibit spark plug firing allowing cranking without starting. | 50-1500 RPM |
| Power Test (RPM/SEC) | Measures engine's power producing potential in units of RPM/SEC. Used when programmed engine constants and corresponding Vehicle Identification Number (VID) have not been established. | 500-3500 RPM/s |
| Power Test (% Power) | Measures percentage of engine's power producing potential compared to full power of a new engine. | 0-100% |
| Compression Unbalance (%) | Evaluates relative cylinder compression and displays percent difference between the highest and the lowest compression values in an engine cycle. | 0-90% |
| IGNITION TESTS | | |
| Dwell Angle (TDC) | Measures number of degrees that the points are closed. | 10-72 @ 2000 RPM |
| Points Voltage (VDC) | Measures voltage drop across the points (points positive to battery return). | 0-2 VDC |
| Coil Primary | Measures voltage available at the coil positive terminal of the operating condition of the coil. | 0-32 VDC |
| FUEL/AIR SYSTEM TESTS | | |
| Fuel Level | Measures level of fuel | Empty-Full |
| Fuel Supply Pressure (psi) | | 0-100 psi |
| Fuel Supply Pressure (psi) | This test measures the outlet pressure of the fuel pump. | 0-10 psi<br>0-30 psi<br>0-100 psi<br>0-300 psi |
| Fuel Return Pressure (psi) | Measures return pressure to detect return line blockage, leaks, or insufficient restrictor back pressure. | 0-100 psi |
| Fuel Filter Pressure Drop (PASS/FAIL) | Detects clogging via opening of a differential pressure switch across the secondary fuel filter. | PASS/FAIL |
| Fuel Solenoid Voltage (VDC) | Measures the voltage present at the fuel shutoff solenoid positive terminal. | 0-32 VDC |
| Air Cleaner Pressure Drop (RIGHT) (In $H_2O$) | Measures suction vacuum in air intake after the air cleaner relative to ambient air pressure to detect extent of air cleaner clogging. | 0-60 in. $H_2O$ |
| Air Cleaner Pressure Drop (LEFT) (In $H_2O$) | Second air cleaner on dual intake systems. | 0-60 in. $H_2O$ |
| Turbocharger Outlet Pressure (RIGHT) (In Hg) | Measures discharge pressure of the turbocharger. | 0-50 in. Hg |
| Turbocharger Outlet Pressure (LEFT) (In Hg) | Second turbocharger on dual intake systems. | 0-50 in. Hg |
| Airbox Pressure (In Hg) | Measures the airbox pressure of two stroke engines. This measurement is useful in detecting air induction path obstructions or leaks. | 0-20 in. Hg<br>0-50 in. Hg |
| Intake Manifold Vacuum (In Hg) | Spark ignition engine intake system evaluation. | 0-30 in. Hg |
| Intake Manifold Vacuum Variation (In Hg) | Spark ignition engine intake system evaluation. | 0-30 in. Hg |

-continued

| Test | Test Description and Application | Exemplary Measurement Range(s) |
|---|---|---|
| | LUBRICATION/COOLING SYSTEM TESTS | |
| Engine Oil Pressure (psi) | Measures engine oil pressure. | 0-100 psi |
| Engine Oil Filter | Measures the pressure drop across the engine oil filter as indicator of filter element clogging. | 0-25 psi |
| Engine Oil Temperature (° F.) | Primarily applicable to air cooled engines. Requires transducer output shorting switch on vehicle to perform system zero offset test. | 120-300° F. |
| Engine Oil Level (qts) | Measures level of engine oil | 4-15 qts |
| Engine Coolant Level | Measures level of engine coolant | Low-Max |
| Engine Coolant Temperature (° F.) | Transducer output shorting switch on vehicle required. | 120-300° F. |
| | STARTING/CHARGING SYSTEM TESTS | |
| Battery Voltage (VDC) | Measure battery voltage at or near battery terminals. | 0-32 VDC |
| Starter Motor Voltage (VDC) | Measures the voltage present at the starter motor positive terminal. | 0-32 VDC |
| Starter Negative Cable Voltage Drop (VDC) | Measures voltage drop on starter path. A high voltage indicates excessive ground path resistance. | 0-2 VDC |
| Starter Solenoid Volts (VDC) | Measures voltage present at the starter solenoid's positive terminal. Measures current through battery ground path shunt. | 0-32 VDC |
| Starter Current, Average (amps) | Measures starter current. | 0-1000 A<br>0-2000 A |
| Starter Current First Peak (Peak Amps, DC) | Provides a good overall assessment of complete starting system. Tests condition of the starting circuit and battery's ability to deliver starting current. The measurement is made at the moment the starter is engaged and prior to armature movement. Peak currents less than nominal indicate relatively high resistance caused by poor connections, faulty wiring, or low battery voltage. | 0-1000 A<br>0-2000 A |
| Battery Internal Resistance (Milliohms) | Evaluate battery condition by measuring battery voltage and current simultaneously. | 0-999.9 mohm |
| Starter Circuit Resistance (Milliohms) | Measures the combined resistance of the starter circuit internal to the batteries. | 0-999.9 mohm |
| Battery Resistance Change (Milliohms/sec) | Measures rate of change of battery resistance as an indicator of battery condition. | 0-999.9 mohm/s |
| Battery Current | Measures current to or from the battery. | −999-1000 A<br>−999-2000 A |
| Battery Electrolyte Level (PASS/FAIL) | Determines whether electrolyte in the sensed cell is of sufficient level (i.e., in contact with electrolyte probe). | PASS/FAIL |
| Alternator/Generator Output Voltage (VDC) | Measures output voltage of generator/alternator. | 0-32 VDC |
| Alternator/Generator Field Voltage (VDC) | Measures voltage present at alternator/generator field windings. | 0-32 VDC |
| Alternator/Generator Negative Cable Voltage Drop (VDC) | Measures voltage drop in ground cable and connection between alternator/generator ground terminal and battery negative terminal. | 0-2 VDC |
| Alternator Output Current Sense (VAC-RMS) | Measures voltage output at the current transformer in 650 ampere alternator. | 0-3 VAC |
| Alternator AC Voltage Sense (VAC-RMS) | Measures alternator output voltage. | 0-22 VAC |

At step 310, shown in FIG. 5, a communication link is established between control system 12 and an off-board computer system. As noted above, the off-board computer system is only one of many off-board electronic devices 150 that control system 12 may be configured to communicate with. Also, off-board computer system may be any of a number of computer systems. However, it is often desirable for off-board computer system to be owned and/or operated under the direction of the owner of concrete vehicle 10, the manufacturer of concrete vehicle 10, or some other contracted maintenance facility.

The communication link may be initiated by either control system 12 or the off-board computer. In an exemplary embodiment, control system 12 is configured to establish a communication link with the off-board computer when a fault code has been identified or a threshold for a vehicle parameter has been breached. For example, if engine control system 70 outputs a fault code indicating that there is a problem with the engine coolant temperature, then control system 12 establishes contact with the off-board computer to determine what further steps are necessary (i.e., perform diagnostic test, return vehicle immediately, etc.). In another embodiment, the off-board computer may be configured to establish the communication link with control system 12 at regular intervals (e.g., once a month, once a week, etc.) to perform various diagnostic tests. In this manner, the off-board computer is able to perform periodic checkups on control system 12.

In an exemplary embodiment, concrete vehicle 10 and the off-board electronic device 150 (e.g., off-board computer, PDA, etc.) has a unique identifier that is utilized in establishing the communication link. In one embodiment, the unique identifier may be a telephone number. In another embodiment, the unique identifier maybe an IP address. The unique identifier is used to ensure that the correct off-board device establishes a communication link with the correct concrete vehicle 10 and vice versa.

At step 312, shown in FIG. 5, a diagnostic test is performed. As previously mentioned, the diagnostic test may be any of a number of conventional and/or custom diagnostic tests such as those shown in Table 1. In another exemplary embodiment, the diagnostic test is performed under the control of the off-board computer. In this embodiment, the off-board computer establishes a communication link with control system 12 and begins the diagnostic test. At each step, the result from the test is transmitted to the off-board computer system which then specifies the next step to be performed based on the previous result received. Thus, in this embodiment, steps 312 and 314 are performed multiple times. This configuration may be desirable to reduce the memory and microprocessor requirements associated with control system 12.

In another exemplary embodiment, control system 12 may be configured with the diagnostic codes and procedures necessary to perform the diagnostic test. For example, once the communication link is established, the off-board computer transmits a command identifying the diagnostic test to be run. Control system 12 receives the command and performs the appropriate diagnostic test. At the conclusion of the test, the results are transmitted back to the off-board computer as shown by step 314, which, based on the results, may specify another diagnostic test to perform. This configuration may be desirable because it lessens the amount of wireless communication between control system 12 and the off-board computer.

In another exemplary embodiment, a communication link is established between control system 12 and the off-board computer, as shown by step 310. The off-board computer then instructs the control system what diagnostic test to perform, etc. The communication link is broken and control system 12 performs the diagnostic test as shown by step 312. In one embodiment, control system 12 is configured to perform the diagnostic test immediately or shortly after receiving commands from the off-board computer. In another embodiment, control system 12 may be configured to perform the diagnostic test over a period of time (e.g., a week, a day, etc.). During this time, control system 12 is configured to monitor concrete vehicle 10 until the appropriate conditions are met and then perform the diagnostic test. For example, certain diagnostic tests may be performed only after concrete vehicle 10 has been traveling above a certain speed (e.g., 55 mph) for a certain amount of time (e.g., 10 minutes). During the course of normal operation of concrete vehicle 10, control system 12 determines when these conditions are met and then performs the diagnostic test. This manner of performing routine tests does not interfere with the primary function of concrete vehicle 10—mixing, pouring, and transporting concrete. Once control system 12 has performed all the diagnostic tests or after a certain period of time has expired then the communication link between control system 12 and the off-board computer is reestablished and the results of the diagnostic tests are transmitted to the off-board computer, or, if a test was not performed, then that fact is transmitted to the off-board computer.

Also, it should be understood, that in many instances, performing a diagnostic test requires input from the operator of concrete vehicle 10. For example, in another exemplary embodiment, control system 12 is configured to display information to the operator of concrete vehicle 10 to perform certain operations to assist in performing the diagnostic test. Typically, this consists of instructing the operator to perform a task so that concrete vehicle 10 is in the appropriate condition to perform the test (e.g., traveling at 55 mph down a road, etc.)

Referring to FIG. 6, a diagram of another exemplary embodiment for performing a diagnostic test is shown. This embodiment is similar to that shown in FIG. 5 except that in this embodiment, control system 12 is configured to perform the diagnostic test without first establishing a communication link with the off-board computer and/or being commanded to perform the diagnostic test by the off-board computer. Control system 12 may be configured to perform the diagnostic test over a period time during the normal operation of concrete vehicle 10 or, alternatively, at a specified time (e.g., weekly, daily, etc.). The frequency for performing the test often depends on the type of test since some tests may need to be performed daily while others may need to be performed weekly, for example.

In an exemplary embodiment, as shown by Step 318 shown in FIG. 6, the diagnostic test is performed during the normal operation of concrete vehicle 10. As explained above, control system 12 monitors the operating conditions of concrete vehicle 10 to determine when the conditions are appropriate to perform the test. At that time, control system 12 performs the diagnostic test, as shown by step 312, and stores the results in memory. As shown by step 310 in FIG. 6, a communication link is established between control system 12 and the off-board computer so that the results of the test are transmitted to the off-board computer as shown by step 314. In this embodiment, the communication link is established periodically.

In another exemplary embodiment, control system 12 may be configured to perform steps 312, 310, and 314 in a relatively short period of time. For example, if a fault code is output, control system 12 may be configured to immediately perform one or more diagnostic tests. Once the results have been obtained, then control system 12 establishes a communication link with the off-board computer and transmits the results to the off-board computer.

Referring to FIGS. 5 and 6, in another exemplary embodiment, the off-board computer is configured to log the information that is transmitted from control system 12. Of course, control system 12 may also be configured to log the information in data logger 32.

Referring to FIG. 7, another exemplary embodiment of a process that may be performed by control system 12 is shown. In this embodiment, a communication link is established between control system 12 and the off-board computer at step 310. The communication link may be established in any of the ways described above. In an exemplary embodiment, the communication link is established periodically (e.g., weekly, monthly, yearly, etc.)

At step 316, control system 12 transmits vehicle usage information to the off-board computer. The type of information that may be transmitted to the off-board computer includes, but should not be limited to, fuel usage, concrete delivery information (e.g., amount of concrete delivered since last time vehicle usage information was received, etc.), odometer reading, etc. This information may be used in a number of advantageous ways. For example, this information may be used to provide an estimate of the lifecycle cost of concrete vehicle 10 (i.e., the cost to purchase, operate, and maintain concrete vehicle 10 for its operational life).

Figure 8:
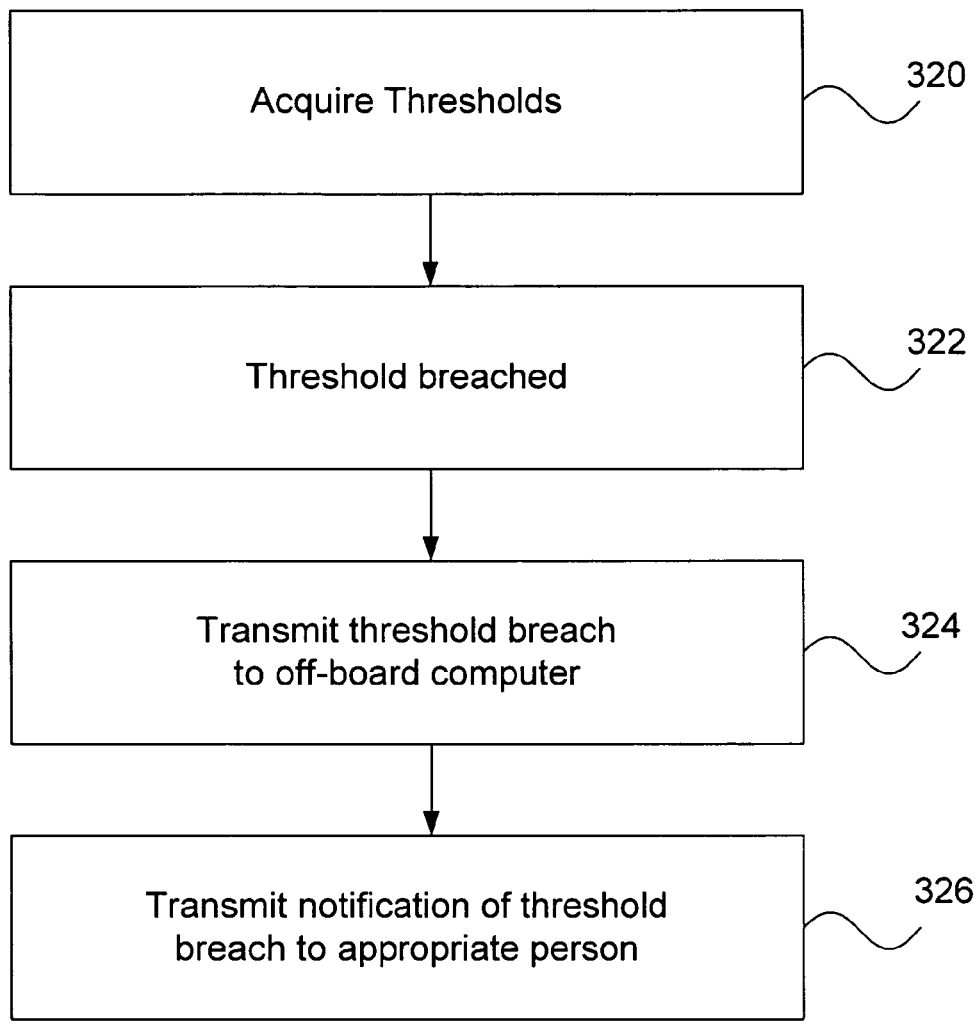
FIGS. 8 and 9 are block diagrams of an exemplary embodiment of processes for communicating a threshold breach to an off-board electronic device.

Referring to FIG. 8, in another exemplary embodiment, control system 12 is configured to include thresholds for various vehicle parameters. When the thresholds are breached, control system 12 is configured to notify the appropriate person so that corrective action may be taken.

At step 302, shown in FIG. 6, control system 12 acquires thresholds for various vehicle parameters. In general, thresholds may be set for any of the vehicle parameters associated with input devices 30, output devices 40, and the input and output devices associated with control systems 70-73. In an exemplary embodiment, thresholds may be set for any of the following parameters: engine coolant temperature, engine oil level, engine speed, fuel level, odometer reading, and transmission fluid temperature, turbo pressure, volts, vehicle speed, engine oil pressure, etc. In general, thresholds may be set for any of the parameters shown in Table 1.

In an exemplary embodiment, the thresholds are input by the operator of concrete vehicle 10. In another exemplary embodiment, the thresholds are set by the manufacturer of concrete vehicle 10. Also, some thresholds may be configured so that the operator of concrete vehicle 10 or other persons cannot alter the thresholds (e.g., threshold for the engine coolant temperature, etc.). In addition, many thresholds may be configured to be the same or similar to the conditions that generate a fault code.

At step 322, control system 12 monitors the various inputs and outputs to determine whether a threshold has been breached. This is done in a straightforward manner by monitoring the traffic in control systems 70-73 and, in the configuration shown in FIG. 4, by monitoring input and output devices 30 and 40.

If a threshold is breached, then control system 12 is configured to transmit information identifying which parameter breached a threshold to an off-board computer, as shown by step 324. The off-board computer is configured to store the information in memory, which may be combined with the overall vehicle usage data information referred to in FIG. 7. After storing the breach information, the off-board computer is configured to notify an appropriate person (e.g., fleet manager, maintenance facility, etc.) that the threshold was breached. Timely notification of a breach of a threshold may result in substantial maintenance and repair savings. In another embodiment, control system 12 may be configured to transmit the breach information to the off-board computer and transmit the notification of the breach to the appropriate person.

In an exemplary embodiment, the person is notified by calling the person's wireless telephone number. A voice then informs the person of the breach. In other exemplary embodiments, the person may be notified by email, pager, fax, etc. that there has been a breach.

Figure 9:
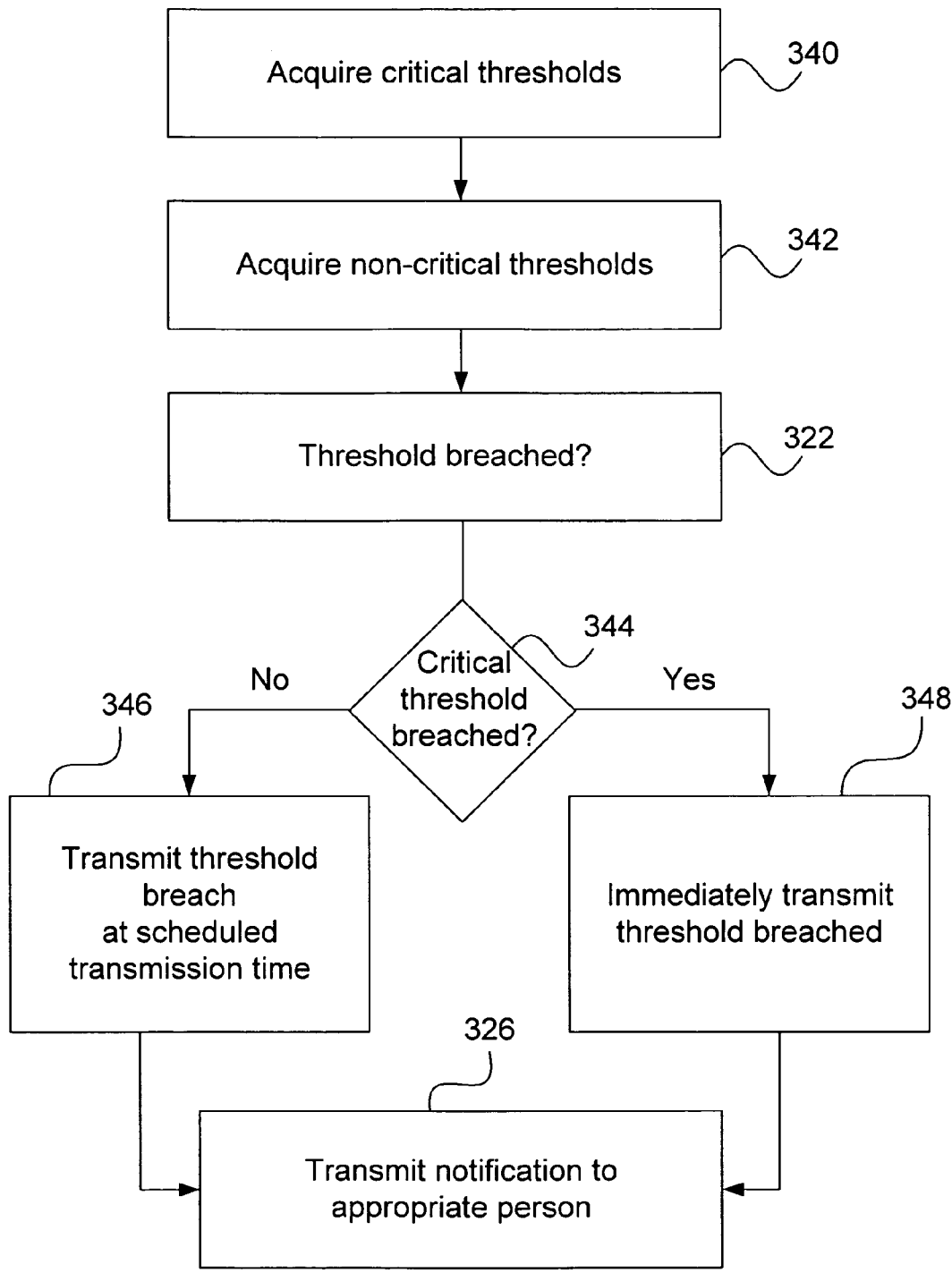

Referring to FIG. 9, another exemplary embodiment of a process for communicating threshold breaches is shown. In this embodiment, the thresholds are divided into critical thresholds and non-critical thresholds. In general, critical thresholds may be thought of as those thresholds that if breached may cause substantial damage to concrete vehicle 10 (e.g., engine coolant temperature, transmission fluid temperature, engine oil pressure, air bag deployed, etc.). Non-critical thresholds are just the opposite. Also, there may be a critical threshold and non-critical threshold for a single parameter. For example, the engine coolant temperature may be configured to have a non-critical temperature threshold where the temperature is unusually high but is not sufficient to cause damage to the engine and a critical temperature threshold where the temperature is high enough that the engine may be damaged.

As shown in FIG. 9, the first steps 340 and 342 are to acquire the critical and non-critical thresholds. As described above in connection with step 320 in FIG. 8, these thresholds may be obtained from a number of ways. At step 322, control system 12 is configured to monitor the various parameters of concrete vehicle 10 to determine if a threshold has been breached.

Once a threshold has a been breached, then the control system 12 must determine whether the threshold was a critical threshold as shown by step 344. In an exemplary embodiment, if it is not a critical threshold, then control system 12 is configured to store the threshold breach in memory until the next time a communication link is established between control system 12 and the off-board computer, at which time, the threshold breach information is transmitted to the off-board computer. If the threshold is a critical threshold, then control system 12 is configured to immediately establish a communication link with the off-board computer and transmit the threshold breach information, as shown by step 348.

At step 326, control system 12, or, alternatively the off-board computer, is configured to notify the appropriate person of the threshold breach. The particular method used to notify the appropriate person may depend on whether the threshold was a critical threshold or not. For example, if a critical threshold was breached, then the person may be notified using one or all of a pager, a wireless telephone, and a landline telephone. However, if the threshold was not critical, then the person may be notified in a less intrusive manner (e.g., email, direct voicemail message, etc.)

In another embodiment, fault codes from control system 12, including fault codes from control systems 70-72 and any other control systems that may be included in control system 12, may be communicated to off-board electronic device 150. The fault codes may be communicated to off-board electronic device 150 in a number of suitable ways. For example, the fault codes may be communicated in any of the situations described previously including performing diagnostic tests, communicating threshold breaches, etc. In one embodiment, the fault codes that are configured to be communicated to off-board electronic device 150 are those fault codes from engine control system 70 and/or transmission control system 71. In another embodiment, the fault codes pertaining to the operation of the body 116 of concrete vehicle 10 (e.g., mixing drum 114, motor used to rotate mixing drum 114, water storage and delivery system 126, etc.). In general, the fault codes may be provided for any of the parameters shown in Table 1. In another embodiment, the fault codes may be provided from the engine, transmission, antilock brake system, and the mixer.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges, etc. provided. Accordingly, these terms should be interpreted as indicating that insubstantial or inconsequential modifications or alterations of the subject matter described and claimed are considered to be within the scope of the invention as recited in the appended claims.

The construction and arrangement of the elements of the concrete vehicles and control systems as shown in the exemplary embodiments are illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to any of the exemplary embodiments. Other substitutions, modifications, changes and omissions may be made in the design, operating conditions and arrangement of the various exemplary embodiments without departing from the scope of the present invention as expressed in the appended claims.

What is claimed is:

1. A concrete vehicle comprising:
a chassis including a frame and wheels;
a concrete handling system supported by the frame and wheels;
a vehicle subsystem control system which comprises an electronic control unit, the vehicle subsystem control system being configured to include status information for a plurality of vehicle parameters, the vehicle subsystem control system being configured to implement a diagnostic test;
a wireless communication system configured to communicate with an off-board electronic device and the vehicle subsystem control system, the wireless communication system being configured to communicate status information pertaining to at least one vehicle parameter to the off-board electronic device; and
the wireless communication system configured to receive commands from the off-board electronic device, the off-board electronic device being configured to communicate a diagnostic test command to the vehicle subsystem control system via the wireless communication system, the diagnostic test command comprising instructions for implementing the diagnostic test;
wherein the diagnostic test is implemented on a vehicle component when a predetermined vehicle condition exists;
wherein the vehicle subsystem control system is configured to monitor at least one concrete vehicle data to determine when the predetermined vehicle condition is achieved;
wherein the vehicle subsystem control system is configured to implement the diagnostic test on the vehicle component in response to the diagnostic test command, the diagnostic test command being based on an occurrence of the predetermined vehicle condition.

2. The concrete vehicle of claim 1, wherein the vehicle subsystem control system includes at least one of an engine control system, a transmission control system, a central tire inflation control system, or an antilock brake control system.

3. The concrete vehicle of claim 1, wherein the wireless communication system is further configured to communicate status information pertaining to at least one vehicle parameter to the off-board electronic device when the vehicle parameter breaches a threshold.

4. The concrete vehicle of claim 3, wherein multiple thresholds are set for at least one vehicle parameter.

5. The concrete vehicle of claim 4, wherein one of the multiple thresholds is a critical threshold, and wherein the vehicle subsystem control system is configured to communicate status information pertaining to a breach of the critical threshold to the off-board electronic device immediately after the breach occurs.

6. The concrete vehicle of claim 1, wherein the off-board electronic device includes at least one of a pager, a computer, a wireless telephone, or a landline telephone.

7. The concrete vehicle of claim 1, wherein the wireless communication system is configured to establish a direct wireless link with the off-board electronic device.

8. The concrete vehicle of claim 1, wherein the wireless communication system is configured to communicate with the off-board electronic device by way of the Internet.

9. The concrete vehicle of claim 1, wherein the vehicle parameters are chassis vehicle parameters.

10. The concrete vehicle of claim 1, wherein the concrete handling system includes a mixing drum.

11. The concrete vehicle of claim 1, comprising a data logger and an operator interface both of which are communicatively coupled to the wireless communication system and/or the vehicle subsystem control system.

12. The concrete vehicle of claim 1, wherein the vehicle subsystem control system further comprises a plurality of microprocessor based interface modules, the interface modules being coupled together by way of a communication network, the interface modules being distributed throughout the concrete vehicle.

13. The concrete vehicle of claim 1, wherein a diagnostic test result is transmitted to the off-board electronic device.

14. The concrete vehicle of claim 1, wherein data relating to the predetermined vehicle condition is transmitted to the off-board electronic device.

15. The concrete vehicle of claim 1, wherein the predetermined vehicle condition is the concrete vehicle maintains a vehicle speed for an amount of time.

16. The concrete vehicle of claim 1, wherein the wireless communication system transmits a no diagnostic test result to the off-board electronic device based on the diagnostic test command being initiated and the diagnostic test not being performed within a predetermined time period from the diagnostic test command being initiated.

* * * * *